United States Patent [19]

Blinken et al.

[11] Patent Number: 4,796,293

[45] Date of Patent: Jan. 3, 1989

[54] ENHANCED DEDICATED TELECONFERENCING SYSTEM

[75] Inventors: Robert J. Blinken, Bedford Hills; Robert J. Blinken, Jr., White Plains, both of N.Y.; Merle D. Garner, Chatham, N.J.; William J. Koenig, Warrington, Pa.; Billy B. Oliver, Chatham, N.J.

[73] Assignee: Communications Network Enhancement Inc., New Providence, N.J.

[21] Appl. No.: 135,096

[22] Filed: Dec. 18, 1987

[51] Int. Cl.$^4$ .................................. H04M 3/56
[52] U.S. Cl. ........................ 379/202; 370/62; 379/204; 379/130
[58] Field of Search .............. 379/202, 203, 204, 205, 379/206, 130, 112; 370/60, 62

[56] References Cited

U.S. PATENT DOCUMENTS 4,599,493 7/1986 Cave ..................................... 379/247
4,600,814 7/1986 Cunniff et al. .................. 379/356 X
4,716,585 12/1987 Tompkins et al. ................ 370/62 X

OTHER PUBLICATIONS

*Alliance Dedicated Teleconferencing Service Attendant Manual*, Nov. 1986, AT&T.

*Primary Examiner*—James L. Dwyer
*Attorney, Agent, or Firm*—Peter C. Michalos

[57] ABSTRACT

A method and apparatus for enhancing the operation of a teleconferencing system, utilizes a programmed service computer to drive a bridge which has a plurality of ports for establishing communication with a plurality of conferees. The bridge includes a microprocessor which responds to a plurality of commands, each requiring information in the form of plural constant information responses and plural variable information responses. The constant information responses involve the status and identification for a conference and conferees of that conference. The variable response information is specific to each conferee. This may include first and last name for the conferee, as well as the conferee's telephone number. The programming of the service computer supplies the information responses to the microprocessor in the appropriate order for achieving functions, such as the addition, removal and changing of status for conferees. The service computer can also communicate with terminals of the conferees so that data can be passed from one conferee to another.

37 Claims, 2 Drawing Sheets

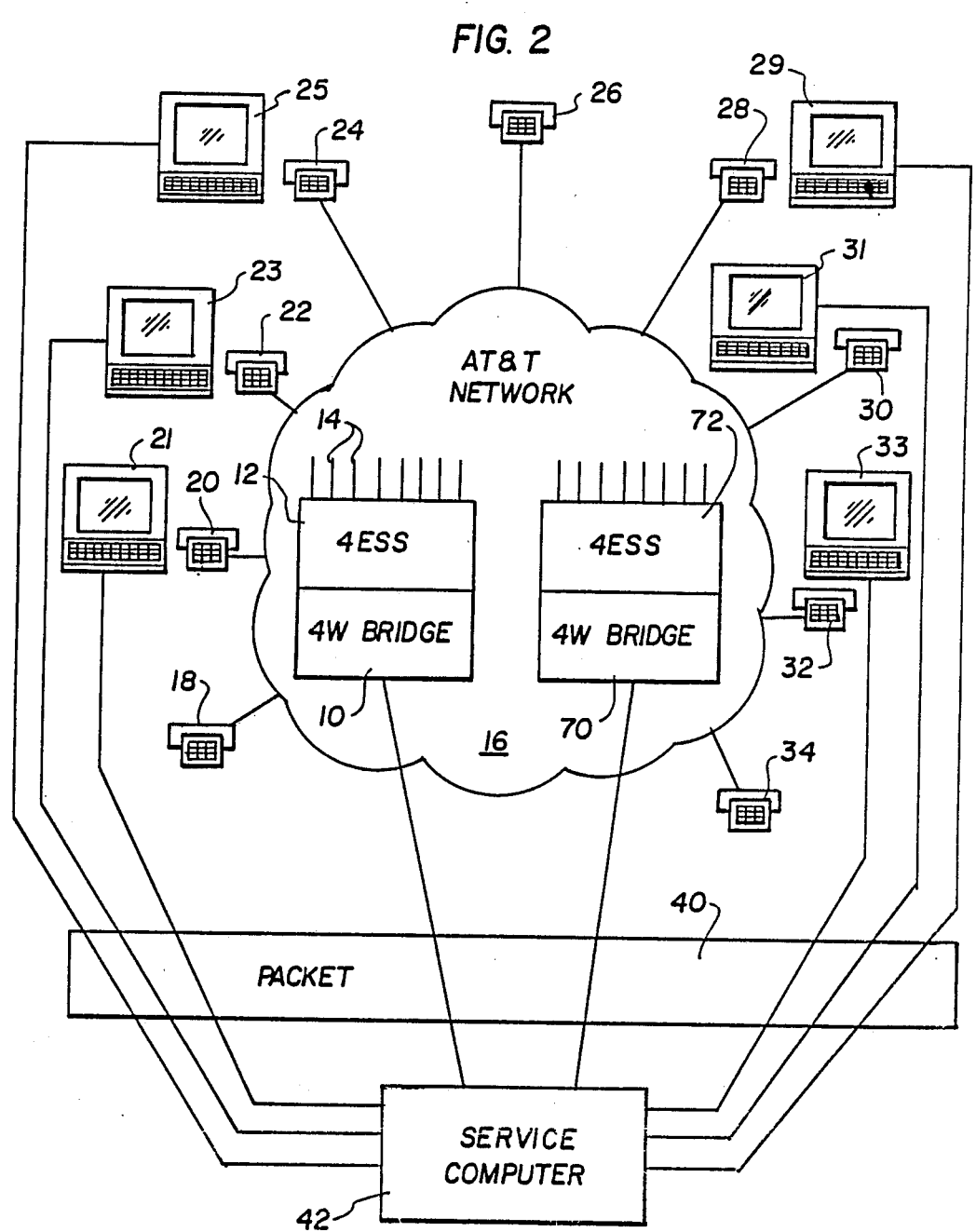

ENHANCED DEDICATED TELECONFERENCING SYSTEM

FIELD AND BACKGROUND OF THE INVENTION

The present invention relates in general to telephone conferencing techniques, and in particular, to a new and useful method and apparatus of operating a dedicated teleconferencing system to conduct a telephone conference among a plurality of conferees. A teleconferencing service known as the ALLIANCE Dedicated Teleconferencing Service is available from AT&T. ALLIANCE is a trademark of AT&T.

The present invention is best understood by having a knowledge of the characteristics and limitations of the ALLIANCE system.

The words "his" and "him" should be interpreted to include both male and female genders throughout this application.

The ALLIANCE System Configuration

The ALLIANCE system, which is shown at FIG. 1, utilizes a microprocessor controlled device called a bridge 1, which has up to fifty-six ports 2, which can simultaneously connect up to fifty-six telephone lines 3, into a single teleconference, twenty-eight two-party teleconferences, or any number of teleconferences between one and twenty-eight which do not exceed the bridge's fifty-six-port capacity. In order to access lines, the bridge ports are directly connected to a so-called 4ESS toll switch 4, which is a part of the AT&T telephone network. The fifty-six ports are divided into seven groups of eight ports each, shown at 5. A different type of telephone service may be subscribed to by each group. For example, one group may have so-called band 4 WATS service, three groups band 2 WATS service, and all remaining groups regular MTS service. Groups of ports which have the same type of telephone service are known as segments. In the example above, there would be three segments called "1", "2", and "3".

A teleconference can be reserved, initiated ("setup"), monitored and controlled by an attendant using a terminal or personal computer (PC) using software which allows the PC to emulate a terminal 6. Communication between the attendant terminal and the microprocessor of the bridge is established over a dedicated private data line 7. Modems 8 are used to convert the digital signals of the bridge and attendant terminals to analog signals so that these signals may traverse the private data line. The bridge can be controlled by up to three attendant terminals.

The bridge also has a provision which allows up to three attendants to place themselves on the audio portion of any active conference. There are two methods by which audio communication between the attendant and the bridge can be established. A dedicated private voice line 9 may be attached to one of the bridge's three dedicated attendant audio ports P. The second method allows the attendant to specify that he be dialed back on a public voice line L, which requires the use of an available bridge port 2.

Some of the most important characteristics of the ALLIANCE system configuraton vis-a-vis the present invention is that it is a dedicated system. That is:
 (a) The means of control (attendant terminals) are dedicated to a single bridge;
 (b) Any single bridge may only communicate with a maximum of three attendant terminals; and
 (c) The attendant terminals' location is fixed by the need to use private data lines for his communication with a bridge.

The ALLIANCE System Commands and Displays

Once a communication link between an attendant terminal and the bridge's microprocessor is established, the bridge can be controlled using specific commands sent by the terminal. The bridge microprocessor sends to the terminal three types of data:
 1. Prompts requesting particular types of data to be entered by the attendant depending on the situation;
 2. Display characters and control characters (Control characters are recognized by the terminal, but not displayed. They control the format of the display characters and other non-displayed functions of the terminal, such as emitting "beep" tones); and
 3. Status messages which appear briefly on the twenty-fourth line of the terminal display. Status messages are generated by the bridge every time a change in a conference's or conferee's status changes. For example, the start and end of a conference, conferee on conference, with port number indicated or dropped from a conference, etc.

In practice, the attendant first enters a carriage return which causes the bridge to return the prompt "COMMAND:" in order to request a command. At this prompt, the attendant must type in the first command. If, at this time, or any other time, the "COMMAND:" prompt appears, the attendant enters the letter "H" for HELP, a summary of the ALLIANCE commands is displayed (see Table 1).

TABLE 1

| ADMINISTRATIVE COMMANDS | |
|---|---|
| ATTENDANT dial back/dedicated line is available | line need MAINTENANCE DATE and TIME |

| STATUS COMMANDS | |
|---|---|
| ACTIVE conference MONITOR conference | attendant requested QUEUE STATUS reports |

| RESERVATION COMMANDS | |
|---|---|
| ADLIB conference DIRECTORY daily LOG | MEETME conference PRESET conference SCHEDULE |

| CONFERENCE COMMANDS | |
|---|---|
| BLASTUP a conference CALL a number | LISTEN to ports on a conference change MODE of a conf/conferee |

TABLE 1-continued

| | |
|---|---|
| COMBINE two conferences | OFF conference |
| DIVIDE into sub-conferences | ON a port/conference |
| DROP a port/conference | SETUP conference |
| JOIN sub-conference | change-SUB-conf. assignment |

COMMAND:

The commands are divided into four categories (as shown in Table 1):

Administrative Commands; Status Commands; Reservation Commands and Conferencing Commands. It is noted that each command can be abbreviated by a unique one, two or three letter string of characters, such as "AT" for ATTENDANT, or "MA" for MAINTENANCE. "MON" is necessary for MONITOR since "MO" is also the first two letters of the MODE command.

The first category is Administrative Commands such as "ATTENDANT" or AT, which gives the attendant his voice/path status. This indicates to the attendant whether the attendant is on a dedicated or dial-back voice path. Another administrative command is MAINTENANCE or MA, which marks a port or group of ports for maintenance. This may be required if one or more ports must be taken out of service, for maintenance. "AVAILABLE" is used to make a port(s) available for use, once maintenance has been completed. "DATE" and "TIME" are used for setting the date and time of the bridge's microprocessor clock/calendar function.

The second group of commands known as Status Commands, return information to the attendant's terminal concerning a conference in progress or the condition of the bridge at any particular time. The most relevant status command to the present invention is the "MONITOR" command. This command allows the attendant to monitor the status of a single specified active conference. The MONITOR command is discussed in detail later on in this section.

Another status command is "ACTIVE" or "AC", which, when typed by the attendant, allows the attendant to see what conferences are currently in progress on the bridge. The information returned to the attendant in response to the "AC" command, includes the type of conference (which will be explained later), the name of the conference, the date therefore, starting and finishing times for the conference, the number of ports being used by the conference (i.e. the maximum number of conferees involved), a code used for one type of conference (the Meetme conference) and whether the Meetme conference is of the assisted or un-assisted type. Other status commands are "QUEUE" or "Q" which displays the ports that have requested attendant assistance, "STATUS" or "ST", which displays the last one hundred status messages that the attendant has received, and "PORT" or "PO", which displays the current status of each port as either in-use, available, or out-of-service for maintenance.

The third group of commands are the Reservation Commands. The Reservation Commands are used to create and maintain a conferee directory, to establish different types of conferences, and to add, change, delete and list conference and directory entries. The "LOG" and "SCHEDULE" commands are for printing lists of which ports and conferences respectively, are reserved for a specified time period.

The "INIT" command erases all conference reservations and conferee directory entries from the microprocessor of the bridge. "INIT" is not displayed on the Help display (Table 1).

As described earlier, the microprocessor of the bridge provides for a single conferee directory with a capacity of up to fifteen hundred unique conferee entries. Using the "DIRECTORY" or "DIR" command, an attendant can add, delete, list and erase directory entries. Each directory entry contains the first name, last name, primary phone number, secondary phone number and segment type for each of the primary and secondary phone numbers.

If the directory is to be manipulated, the attendant types "DI" after the "COMMAND:" prompt. This generates a menu of options (add, change, etc.):

The menu is reproduced below as "MENU 1":

MENU 1

| | |
|---|---|
| ADD an entry | ERASE the entire file |
| CHANGE an entry | LIST entries in the directory |
| DELETE an entry | QUIT the directory |
| OPTION: \_\_\_\_ | |

At the prompt "OPTION", the attendant types a single letter to request a sub command. The letter "A" for "ADD", for example.

This causes the ALLIANCE bridge microprocessor to return a second menu labeled "MENU 2" below:

MENU 2

— cancel entry                @ — quit adding entries

| NUMBER | LAST NAME | FIRST NAME | PHONE NUMBER | SEG |
|---|---|---|---|---|
| | | | P: | |
| | | | S: | |

Each time the operator presses the RETURN or ENTER key on the keyboard of his terminal, the cursor, beginning at "Last Name", advances to the next column corresponding to one of the six fields. At each field, the attendant must enter the appropriate information which is here referred to as variable information reponses.

It should be noted that the next available directory number is assigned by the bridge microprocessor to each newly added conferee. Ths storage of conferee data is common for all conferences and is not subdivided in any way. Multiple directory entries for the same conferee name are not permitted. The only way then to have more than one phone number for a conferee is to specify a secondary phone number in row "S:". However, in order to use this secondary number, it must be manually chosen for each conferee during conference set-up, using a more labor-intensive series of commands than normal. Because the secondary number cannot be chosen for use prior to the conference being set-up, using a secondary number requires the ALLIANCE conference set-up procedure to take a longer amount of time.

Four types of conferences can be conducted using the ALLIANCE bridge: Preset; Meetme; Adlib; and Demand. Preset, Meetme and Adlib conferences require a conference reservation to be made in advance of the conference. The "PRESET", "MEETME", or AD-LIB" reservation commands respectively, are used for this purpose.

To operate a Reservation Command, the attendant first types the appropriate command such as "PRE" for a Preset conference entry. The attendant must then, by using another group of sub-commands, such as "ADD", "CHANGE", or "DELETE" indicate to the bridge what will be done with regard to a Preset conference entry. The selected sub-command then returns a prompt to the attendant to begin entry of the specific information for that Preset conference, such as conference name, date, start time, finish time, and number of ports. This information is all constant for a specific conference and thus can be thought of as a plurality of constant information responses. The conference type is also a constant for a specific conference. The conference type is automatically entered ("ADD" sub-command) or looked up ("CHANGE, "DELETE") by the microprocessor based on the reservation command chosen.

The differences between the four types of conferences are as follows:

A Preset conference requires that the attendant pre-select the conferees who are to be members of the conference from the directory. The conference size (number of ports) is automatically calculated by the bridge's microprocessor based on how many conferees were selected from the directory. When a Preset conference is set-up (initiated), the attendant has the option of starting the conference right away or of changing any conference or conferee data. The Preset conference can be started in one of two ways:

(a) All conferees can be simultaneously dialed out to by the bridge ("BLASTUP" sub-command); or (b) Conferees can be dialed one-at-a-time by the bridge and connected to the attendant's voice path when they answer. After establishing contact with the conferee, the attendant can add this conferee to the others in the conference ("ATTENDANT" sub-command). The Attendant assisted method only allows conferees to be added in the order in which they are pre-selected. A conferee can be dialed again if busy or if they do not answer using the "REDIAL" option. However, the REDIAl option cannot be performed once the attendant leaves the ASSISTED-SET UP mode.

A Meetme conference reservation requires the attendant to specify the size of the conference and a four-digit code number. In this type of conference, the conferees dial into (i.e., "MEETME") the conference bridge and enter the specified four-digit touch tone code when prompted by a synthesized voice recording which the bridge generates. The touch tone code is used to instruct the bridge as to which conference this heretofore unidentified caller is to be connected. Since all conferees use the same code to dial into a given conference, there is no way to identify which individual conferees were routed into which ports. This is why, in a Meetme conference, no conferees are pre-selected from the directory. Furthermore, no conferee names appear when monitoring the Meetme conference's status ("MONITOR" command discussed later).

An Adlib conference is essentially the same as a Preset, except the conferees are not chosen until the conference is set up:

(a) The conference size (number of ports) must be manually specified when the conference is reserved; and (b) The conferees are selected when the conference is set-up, either from the directory or by the attendant manually entering the conferee data for conferees who are not in the directory.

A Demand conference is a conference that does not have a pre-existing reservation. Demand conferences are reserved and started while performing the SETUP conferencing command. A Demand conference is an Adlib conference which uses the current date and time (supplied by the bridge's microprocessor) for its date and start-time.

If the blast-up method of starting a Preset, Adlib or Demand conference is chosen, the MONITOR command for that conference is automatically executed by the bridge.

A conference is said to start (become active) the first time any one of its conferees' status becomes "ON CONF" (ON CONFERENCE). In the case of a blast-up type conference, the first conferee to answer his phone causes his status to change from "RINGING" to "ON CONF". For a meetme type conference, the first conferee to enter his touchtone code becomes "ON CONF". A conference ends when all of the conferees' status becomes "DROPPED". It should be noted that a meetme conference reservation remains valid for the duration of its reserved time period since meetme conferees may dial in and hang up repeatedly during the course of the conference. Therefore, a meetme conference may alternate between being active and inactive. On the other hand, a blastup type conference reservation ends the first time the preset, adlib or demand, conference becomes inactive.

An actual conference is conducted by an attendant using the Conferencing Commands. Conferencing Commands allow the attendant to "SETUP" (initiate) a conference; "LISTEN" to the ports on a conference; talk and listen "ON" a port or a conference; remove themself from being on a port or conference ("OFF"); change the transmission "MODE" of a conferee/conference between talk and listen, and listen-only modes; change the "SUB"-conference designation for conferees on a conference; "DIVIDE" a conference into its designated sub-conferences; "JOIN" the sub-conferences back into one conference or "DROP" (hangup) a port or conference.

A useful conferencing command besides those mentioned above is called "COMBINE". The COMBINE command is used to combine two or more active conferences into one conference. For purposes of discussion, a "combinee" conference is said to be combined into a "combinor" conference. The COMBINE command's most useful function is to combine a meetme-type conference(s) with a blastup-type conference(s). This allows the user to have a conference where some of the conferees dial into the bridge (meetme) while others are dialed-out to by the bridge (blastup). In practice, however, the COMBINE command has four shortcomings:

1. The combinor and combinee conferences must be active before the COMBINE command can be performed;
2. The COMBINE command must be performed manually by the attendant;
3. In the case of a meetme-type combinee conference, meetme conferees who dial into the bridge after the COMBINE has been executed are not added to the combinor conference. Instead, they become members of a separate conference under the old combinee conference reservation. And, should this reservation expire before these "latecomers" dial into the bridge, conferees will not be able to gain access to any conference; and
4. In the case of a blastup-type combinee conference, blastup conferees who have not been blasted up or who have not been put on conference (i.e., status=RINGING, BUSY, No ANSW), before the COMBINE has been executed cannot be blasted up or called later by the combinee conference. The reason for this is that once a blastup-type combinee conference is combined into a combinor conference, the combinee conference and its associated list of conferees cease to exist in the ALLIANCE microprocessor's reservation system.

These shortcomings cause a catch-22 situation in the case of a COMBINE involving meetme and blastup-type conferees: If the blastup conferees are in the combinor conference, then "late-comer" meetme conferees cannot be automatically added to the combinor conference. If the meetme conferees are in the combinor conference, then all blastup conferees must be present before the combine can be executed. Otherwise, those blastup conferees who were not on conference prior to the combine must be manually added one-at-a-time by the attendant to the combinor conference, using the CALL or BLASTUP command. Therefore, to add "latecomer" conferees in either case requires continued attendant monitoring and command executions.

Another useful conferencing command is called "BLASTUP". The BLASTUP command is used to automatically add a new conferee to an active conference or to dial an reconnect a conferee who has been dropped from the conference either by accident or on purpose. When the party answers, the conferee is added to the specified active conference without operator assistance. If the party does not answer within a certain time period (30-40 seconds), the attempted call is stopped.

To operate the BLASTUP command, the operator first types "BL". With each carriage return (RETURN or ENTER key), the cursor on the attendant's terminal is advanced to the next field. The attendant must, in sequence, enter the constant information responses of conference name and conference type. Then the attendant enters the variable information responses of conferee last name, first name, phone number, segment and transmission mode. If the conference has any conferees with sub-conference designations, the attendant must also enter the sub-conference designations for the BLASTUP conferee.

The number of variable information responses and constant information responses are considerable. Note that the conferee and conference related information responses must be repeated for each conferee even if the conferee has been a prior member of the conference and even if the next command is a BLASTUP for the same conference. A similar volume of information must be input by the attendant to call a party directly through the bridge (using a "CALL" or "CA" command) for the purpose of assisting the party and manually adding the party to the conference. The REDIAL option is also available to the attendant while executing the CALL command.

Since many of the commands used to control the ALLIANCE bridge must be used in conjunction with a relatively large number of constant information responses and variable information responses, much demand is placed on the attendant. This is particularly true for the Conferencing Commands where the attendant must operate during an ongoing conference.

It is noted that each of the responses must be exact, or an error signal will be generated by the ALLIANCE bridge.

A comprehensive listing of the commands to which the ALLIANCE bridge can respond, as well as the error messages which the bridge generates in the event of an error, are listed in a glossary and list of error messages appearing on pages 130 through 136 of a manual of operation for the ALLIANCE bridge, dated November, 1986, entitled: *ALLIANCE Dedicated Teleconferencing Service Attendant MANUAL*. This manual is incorporated here by reference.

At any time during an active conference, the attendant may view the status of all conferees on the conference. To do this, the attendant selects the "MONITOR" or "MON" command. This prompts a request for the conference name which the attendant must type in. A request is then made for the conference type (ad-lib, preset or meetme) and the first letter of the conference type must be entered. At this point, a display is produced on the attendant's terminal as shown below at MENU 3, which indicates the port number under which each conferee is operating, the status of that conferee, the name of the conferee, the phone number of the conferee, the mode of operation (listen-only or two-way), and the sub-conference (if any).

| MENU 3 | | | | | |
|---|---|---|---|---|---|
| NEXT page | | | QUIT monitor command | | |
| | | CONFERENCE preset 1 | | | |
| PORT | STATUS | NAME | PHONE NUMBER | MODE | SUB |
| 1 | ON CONF | john smith | 4085559275 | T | 1 |
| 2 | ON CONF | bob williams | 4155555839 | T | 2 |
| 3 | ON CONF | jim jones | 2125559203 | T | 1 |
| 4 | DROPPED | dick robinson | 3162764608 | L | 1 |
| 5 | RINGING | ruth thompson | 3035247619 | L | 2 |

-continued

MENU 3
NEXT page     QUIT monitor command
CONFERENCE preset 1

| PORT | STATUS | NAME | PHONE NUMBER | MODE | SUB |
|---|---|---|---|---|---|
| 6 | ON CONF | alice abrams | 9146834291 | T | 1 |
| 4 | RINGING | henry patterson | 7184628804 | T | 2 |
| 7 | RINGING | lloyd simon | 2038583204 | T | 1 |
| 8 | RINGING | dick robinson | 3162764600 | T | 1 |

OPTION:

It is noted that in the ALLIANCE service, the port number of each conferee is indicated on the monitor menu. This port number may change, however, for a certain conferee if, for some reason, the conferee is disconnected and then is called again. When called back, the conferee is placed on the next available port in the specified segment and a new status line is generated at the bottom of the list. For example, on MENU 3 "dick robinson" was originally called on port 4, but dropped before "henry patterson" was called. Hence, "henry patterson" was called on port 4 and "dick robinson" was assigned to port 8, since ports 1-7 were in use prior to "dick robinson" being called back. Each page of the monitor menu can display only thirteen (13) status lines. The order of listing of conferees thus may change over the course of the conference. This makes it very difficult for the attendant to follow attendance of the conference, particularly when the status lines fill more than one menu page.

It can be appreciated from the foregoing that substantial effort and care is needed for an attendant to reserve, set up and control conferences and directory entries. The time required by even a skilled attendant to exercise such effort and care often make the use of the ALLIANCE system impractical, despite its theoretical capabilties.

Some of the most important characteritics of the ALLIANCE system microprocessor and commands vis-a-vis the present invention are as follows:

(1) The ALLIANCE microprocessor does not associate attendant terminals in a one-to-one relationship with active conferences. Since any attendant terminal may invoke any of the conferencing commands at any time on any active conference, a portion of all conferencing commands information responses must always identify the conference name and type of conference that the desired action is to apply to. This portion of the conferencing command has been referred to as a "constant information response" earlier.

(2) The single conferee directory has a limit of fifteen hundred names. Duplicate conferee names, even though they may have different phone numbers, are not permitted. All users also have access to all conferee data entries.

(3) The status of a conference cannot be monitored at the same time as any conferencing command is executed. The attendant must (a) write down any relative conference information from the monitor screen (i.e., conference name, type, conferee port number, name and phone number); (b) exit the monitor command and enter the conference command(s) menu; (c) exit the conference command and re-perform the monitor command to view the results of the conference command(s).

(4) In order for the attendant to add people to the conference in a sequential and controlled manner, the attendant must enter each conferee's name and phone number or directory number while the conference is taking place. To do this, the attendant must maintain a separate list with connferee names, telephone numbers, and/or directory numbers on it because this information is not available for display on the attendant terminal while executing the BLASTUP or CALL command.

SUMMARY OF THE INVENTION

A main object of the present invention is to enhance the operation of dedicated teleconferencing services in general, and the AT&T ALLIANCE service, in particular.

According to the present invention, a service computer is interposed between the user (known as the coordinator of a conference) and the dedicated teleconferencing bridge. The service computer maintains directory lists which are specific to named conferences and may include either within a single conference or across multiple conferences, multiple entries of a conferee name with one or more different telephone numbers for that name.

The service computer also stores all constant information responses that are necessary for a specific named conference and conferee of that conference as they are selected from a directory or called independently from outside the directory. In this way, only a minimum amount of information is needed from the coordinator or user. The coordinator need only provide the variable information responses which are specific to a desired function. For example, if a coordinator wishes to add a new conferee, the coordinator need type in only a single letter command, in this case, A for ADD, followed by the first name, last name, and telephone number of the conferee desired. These three fields of information are then stored in the service computer and used in conjunction with the BLASTUP command, conference type, mode, sub-conference (if any), last name, first name, segment and port number, which are all needed in a specific sequence by the ALLIANCE microprocessor. The service computer thus combines the variable information response from the coordinator (identifying the conferee desired) with the constant information responses concerning the conference in progress, to drive the ALLIANCE microprocessor. A typical prompt/response dialogue and terminal screen display for adding a conferee for the ALLIANCE system, and for the present invention are compared at the end of this disclosure in Appendix I.

The same type of economy is utilized for each of the commands needed by the ALLIANCE system. In each case, the response required is divided into constant information responses and variable information responses. Programming in the service computer requests only the variable information responses from the coordinator. The programming combines the constant and variable information responses in the appropriate sequence to drive the ALLIANCE microprocessor.

Another object of the present invention is to utilize the service computer to permit the transfer of notes or other textual data between conferees. This requires that each conferee also has a terminal which is connected to the service computer. Establishment of the data link between the service computer and conferee terminals is orchestrated in the same manner as the coordinator. Conferees without terminals may still participate in a conference, but are limited to voice communication.

Another object of the present invention is to generate a menu for the coordinator which organizes the conferees according to leg number, rather than port number. The leg number for each conferee remains constant throughout the conference. It does not matter whether a conferee leaves a conference momentarily and then is again added to the conference. The conferee will still maintain his initial leg number. Since there is no reason for the coordinator to know the actual port number of the bridge which is being used by each conferee, this information is not displayed to the coordinator. The more useful leg number for each conferee is provided. Indication is also provided adjacent to leg number, (e.g., a plug sign "+") which indicates whether that conferee has a terminal and thus can receive and transmit textual data. The textual data can be transmitted between specific conferees without other conferees being involved. This more closely simulates a live conference where handwritten notes may be passed between conferees with a degree of confidentiality.

Accordingly, the present invention involves an enhanced method of operating a dedicated bridge which utilizes an additional service computer that is programmed to minimize the amount of repetitious data which must be input by an operating coordinator of the conference. The method also includes the possibility of passing textual information between conferees. The possibility of storing potential conferees in multiple directories for multiple conferences also exists.

The invention also includes an apparatus for enhancing the operation of the dedicated teleconferencing system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a schematic block diagram, showing the apparatus of the present invention.

DESCRIPTION OF THE PREFERRED EMBODIMENT

The Present Invention's System Configuration

Figure 1:
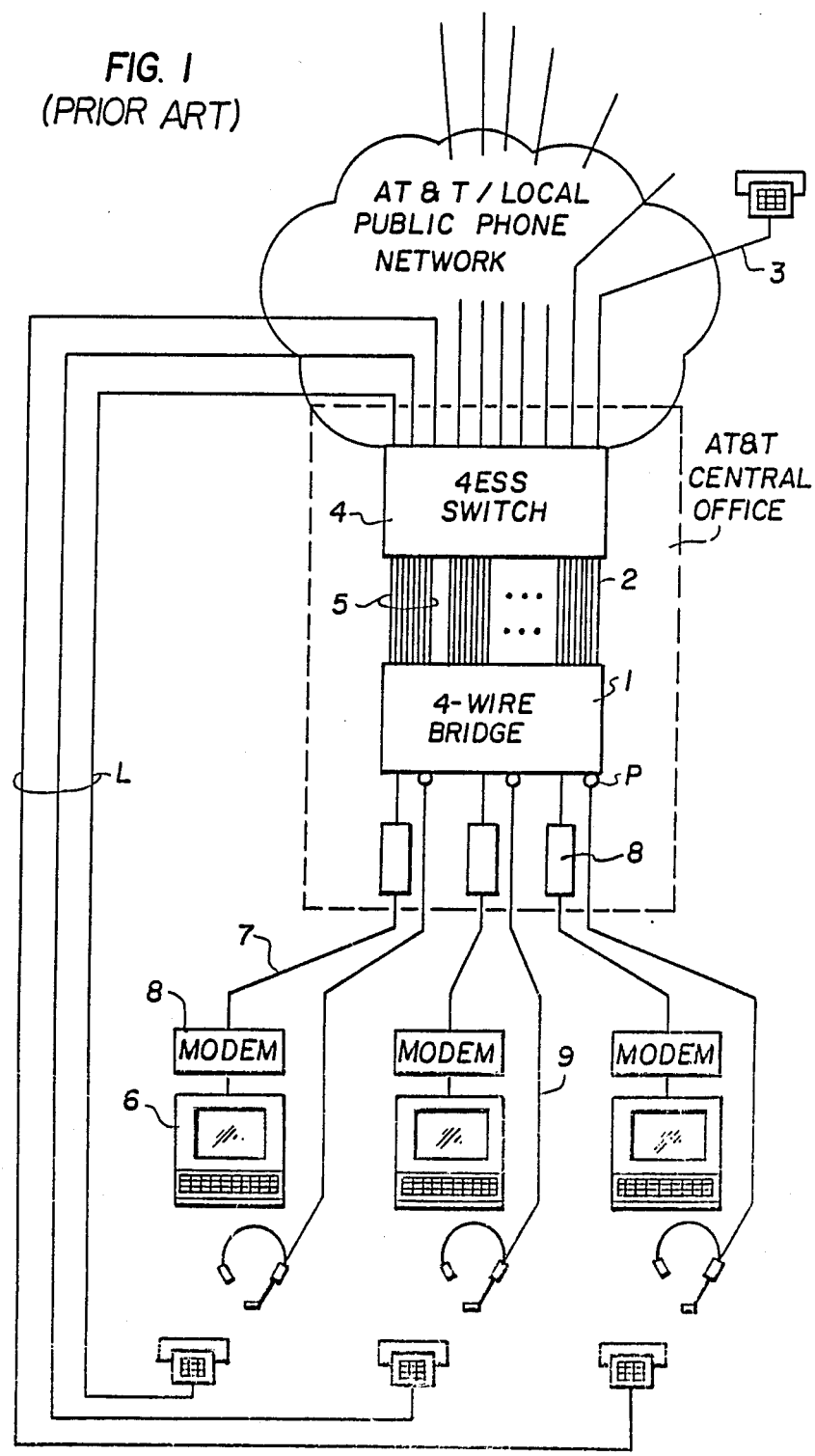
FIG. 1 is a schematic block diagram showing the ALLIANCE dedicated teleconferencing system.

Referring to FIG. 2 in particular, the present invention comprises a method and apparatus for enhancing the operation of a dedicated teleconferencing system, such as the AT&T ALLIANCE bridge generally designated 10. The four-wire bridge, which includes a microprocessor controlled system as disclosed above, is connected through a 4ESS toll switching apparatus 12 to fifty-six ports 14 which can be connected to fifty-six different telephone lines through the existing AT&T telephone network 16. Each of the phones 18, 20, 22, 24, 26, 28, 30, 32 and 34 are assumed to be used by individual conferees. For the purposes of this description, telephones are presumed to be connected to the conferees' telephone lines. In practice, however, any device which uses telephone lines may be attached to a conferee's telephone line to participate in a conference.

The telephone line of each conferee is connected to one of the ports 14 through the AT&T network, to the bridge 10.

Some of the conferees also have computer terminals (or more often, personal computers (PC's), using software which makes the PC emulate a computer terminal) 21, 23, 25, 29, 31 and 33.

In accordance with the present invention, one or more bridges are connected through a private data or packet data link 40 to a conference call service computer 42. The terminals which are associated with some of the conferee telephones are also connected to the service computer through the packet system 40.

The first terminal to establish communications with the service computer is known as the coordinator. The coordinator is given the ability to establish directories and conferences by the service computer. In this case, it is assumed that telephone 20 and terminal 21 are used by the conference coordinator. As will be described later, the coordinator may start a conference by entering the first conferee's telephone number which usually (but does not have to be) his own. More than one first terminal, that is, coordinator, can be connected and serviced by the service computer.

The service computer 42 is programmed to establish communication with, and control, the dedicated bridge 10. The dialogue between the bridge and the service computer is the same as that between the bridge and the attendant terminals of the ALLIANCE system described in the Field and Background section of this disclosure. Programming requires a minimum of input information from the conference coordinator by storing all the constant information responses that are typically needed by the bridge more than once, and by feeding this information to the bridge, as the bridge requests it, to establish, initiate and conduct teleconferences. This information is used by the service computer programming in conjunction with variable information responses from the coordinator terminal 21.

The programming of the service computer 42 also includes the capacity to store multiple directories, each keyed to a different conference (each conference being identified by a distinct conference name), as well as the capacity to receive and transmit text from one conferee terminal to another.

The service computer is also connectable to any other dedicated bridge which is available, such as, for example, bridge 70, which includes its own 4ESS, 56 port digital switch 72.

The way in which conferences are established, initiated and conducted, using the programmed service computer 42, will now be described.

Establishing the Data Link and Gaining Access to the Service Computer

The customer/user is given a login ID and password. These are prearranged with the operator of the service computer. Contact is made with the service computer 42 through the coordinator's terminal 21 and a modem or other appropriate data link, over the packet system 40. This is done by dialing the local access number for the packet system 40 using the terminal 21. The packet system 40 answers and prompts the user for a code which identifies the particular service computer or device they wish to communicate with. Once this code is entered, the packet system establishes the data link between the user terminal 21 and the service computer 42. The service computer responds by prompting for the user's Login ID. This is given by the conference coordinator. This returns a prompt "password:". The coordinator responds with the appropriate password.

Starting the Conference

Once a data link has been established and the service computer accessed by a valid Login ID and password, the service computer then prompts for the coordinator to enter the conference name or telephone number desired. The coordinator may either input a pre-existing conference name or input the first telephone number the service computer should call through the bridge. If a telephone number is entered, the service computer automatically creates a conference name in the form of a single alphabetic character followed by the telephone number. As a practical matter, this will usually be the number of the coordinator's own telephone 20.

The method of starting a conference which has not been prereserved by the service center, but which uses the first telephone number, will be referred to as a "PC-1000" conference, hereafter.

After this, the service computer will ask, using a prompt, how many legs will be needed. The number of legs (which will be the maximum anticipated number of conferees which are to be part of the conference) is then entered. The service computer checks which bridges have enough available capacity for the specified number of legs and displays a list of these bridges on the coordinator's terminal screen. The service computer will then prompt the coordinator to specify which bridge should be used. In the case shown in FIG. 2, there are two bridges 10 and 70, which are presumed to be at different locations. After responding, the service computer will establish a data link over packet 40 with the appropriate bridge. In this case, it is assumed bridge 10 will be used.

Another way of initiating a conference is by conference name. This requires that the user make a reservation with the service computer or center in advance of the conference. The information supplied by the user would include a conference name, date, start and finish time, conferee names and phone numbers. To start the conference, the coordinator would enter the conference name as described above. This type of pre-reserved conference will be referred to as a "PC-2000" conference, hereinafter, and is similar to the ALLIANCE preset-type conference.

A second type of PC-2000 conference is a pre-reserved conference which is similar to the ALLIANCE meetme conference. This type of conference starts when the first conferee enters his four-digit touch tone code in response to the bridge's audio prompt. In this case, the coordinator does not start the conference using his terminal, but, at his option, may monitor and control the conference as discussed in the section below.

Both types of PC-2000 conferences do not require a coordinator to start, monitor, or control them. These activities can be performed by the service center operator.

Monitoring and Controlling the Conference

Unlike the ALLIANCE system, the present invention uses one status screen to simultaneously monitor and control a conference. Once the conference has started as described above, the service computer 42 returns a status screen or menu to the conference coordinator's terminal 21. If the coordinator entered a telephone number to start the conference, the first leg would show the conferee name associated with the login ID and password along with the telephone number entered by the coordinator. This is shown on Menu 4A.

If the coordinator entered a conference name to start the conference, then all conferees appear on the status screen with their status shown as "RINGING" or "ON CONF", depending on whether their phones have been answered yet. The conferees appear in the order in which they appear in the conference directory. This is shown at MENU 4B.

Once the bridge number has been entered, the system displays, on the coordinator's terminal, the conference status screen (Menu's 4A, 4B, for example). The upper part of the screen contains the service name, copyright notice, conference name and elapsed time.

The space between the upper and lower parts of the screen will contain a list of conferees. Each party or conferee is designated a leg number which is in numerical order from the top down. This leg number will stay constant throughout the conference despite any shifting in the actual port of the bridge which will be used for that conferee. If a conferee has a terminal connected to the service computer, a plus ("+") sign appears next to his leg number. This is shown in MENU's 4A, 4B, 4C and MENU 5. The status of the conferee is also listed. This may be "ON CONF" indicating that the conferee is on the conference, "DROPPED" indicating that the conferee has been dropped, "RINGING" indicating that the telephone number of that conferee has been dialed and the phone is ringing, "REDIALING" indicating that the dialing process is being conducted again for a conferee who has previously been "ON CONF" or "NO ANSW." "REQ ATTN" indicating that this party or conferee has pressed the "0" button on his touch-tone phone and requests assistance from the service center operator.

A busy line appears as "RINGING" for a minute and then is automatically redialed by the service computer. If the line is still busy, or if it is not answered, the leg status indicator is changed to "NO ANSW".

<u>MENU 4A</u>

TYPICAL COORDINATOR STATUS SCREEN BEFORE
CONFEREES ADDED TO PC-1000 CONFERENCE

MENU 4A

| CONFERENCE: X4085559275 | CONFERENCE CALL SERVICE ® 1986-87 CNE, Inc. | | Elapsed Time: 00:00:05 | |
|---|---|---|---|---|
| LEG | STATUS | CONFEREE NAME | TELEPHONE | TALK |
| 1+ | ON CONF | John   Smith | (408) 555-9275 | YES |
| Add Conferee<br>Hangup for Conferee<br>Subdivide Conference<br>Telephone Add | Pass Note to Conferee<br>Get Note from Conferee<br>Directory Add Conferee<br>Redial Dropped Conferee | | Change Talk/Listen for Conferee<br>Operator Call(CCS Cntrl Center)<br>Quit(Conference will continue) | |
| Legs 1 thru 1 of 1   Page 1 of 1 | | | | |
| Type First Letter of Action Desired(Listed Above): ____ | | | | |

MENU 4B

TYPICAL COORDINATOR STATUS SCREEN AT

BEGINNING OF PC-2000 CONFERENCE

| CONFERENCE: preset1 | CONFERENCE CALL SERVICE ® 1986-87 CNE, Inc. | | Elapsed Time: 00:00:35 | |
|---|---|---|---|---|
| LEG | STATUS | CONFEREE NAME | TELEPHONE | TALK |
| 1+ | ON CONF | John   Smith | (408) 555-9275 | YES |
| 2 | ON CONF | Bob    Williams | (415) 555-5839 | YES |
| 3 | ON CONF | Jim    Jones | (212) 555-9203 | YES |
| 4 | ON CONF | Dick   Robinson | (316) 276-4608 | YES |
| 5 | RINGING | Henry  Patterson | (718) 462-8804 | YES |
| 6 | RINGING | Ruth   Thompson | (303) 524-7619 | YES |
| 7 | ON CONF | Alice  Abrams | (914) 683-4291 | YES |
| 8 | ON CONF | Lloyd  Simon | (203) 858-3204 | YES |
| Add Conferee<br>Hangup for Conferee<br>Subdivide Conference<br>Telephone Add | Pass Note to Conferee<br>Get Note from Conferee<br>Directory Add Conferee<br>Redial Dropped Conferee | | Change Talk/Listen for Conferee<br>Operator Call(CCS Cntrl Center)<br>Quit(Conference will continue) | |
| Legs 1 thru 8 of 8   Page 1 of 1 | | | | |
| Type First Letter of Action Desired(Listed Above): ____ | | | | |

MENU 4C

TYPICAL CONFEREE STATUS SCREEN WITH

NOTE DELIVERED INDICATION

MENU 4C

| CONFERENCE: preset1 | | CONFERENCE CALL SERVICE | Elapsed Time: 00:00:35 | |
|---|---|---|---|---|
| | | ® 1986-87 CNE, Inc. | | |
| LEG | STATUS | CONFEREE NAME | TELEPHONE | TALK |
| 1+ | ON CONF | John Smith | (408) 555-9275 | YES |
| 2 | ON CONF | Bob Williams | (415) 555-5839 | YES |
| 3 | ON CONF | Jim Jones | (212) 555-9203 | YES |
| 4 | ON CONF | Dick Robinson | (316) 276-4608 | YES |
| 5+ | RINGING | Henry Patterson | (718) 462-8804 | YES |
| 6 | RINGING | Ruth Thompson | (303) 524-7619 | YES |
| 7+ | ON CONF | Alice Abrams | (914) 683-4291 | YES |
| 8 | ON CONF | Lloyd Simon | (203) 858-3204 | YES |

| Note delivered to all destinations | |
|---|---|
| Pass Note to Conferee | Request to Talk |
| Get Note from Conferee | |
| Operator Call(CCS Cntrl Center) | |
| Quit(Conference will continue) | |

Legs 1 thru 8 of 8    Page 1 of 1

Type First Letter of Action Desired(Listed Above): ____

MENU 5

COORDINATOR SCREEN INDICATING:

— Subconference Designations

— Leg 5 Request to Talk

— Note Waiting from Leg 7

— Addition of Leg 9 in Progress

— Operator on Conference

| CONFERENCE: preset1 | | CONFERENCE CALL SERVICE | Elapsed Time: 00:38:10 | | |
|---|---|---|---|---|---|
| | | ® 1986-87 CNE, Inc. | | | |
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | NO | 2 |
| 3 | DROPPED | Jim Jones | (212) 555-9203 | YES | 1 |
| 4 | REDIALING | Dick Robinson | (316) 276-4608 | YES | 1 |
| 5+ | ON CONF | Henry Patterson | (718) 462-8804 | TLK | 2 |
| 6 | ON CONF | Ruth Thompson | (303) 524-7619 | NO | 2 |
| 7+ | REQ ATTN | Alice Abrams | (914) 683-4291 | NO | 1 |
| 8 | ON CONF | Lloyd Simon | (203) 858-3204 | YES | 1 |
| 9 | RINGING | Mark Carrol | (713) 555-2037 | YES | 2 |

| Note waiting from leg 7 | | |
|---|---|---|
| Add Conferee | Pass Note to Conferee | |
| Hangup for Conferee | Get Note from Conferee | Change Talk/Listen for Conferee |
| Subdivide Conference | Directory Add Conferee | Operator Call(CCS Cntrl Center) |
| Telephone Add | Redial Dropped Conferee | Quit(Conference will continue) |

Legs 1 thru 9 of 9    Page 1 of 1          OPERATOR ON CONFERENCE

Type First Letter of Action Desired(Listed Above): ____

MENU 6

TYPICAL PASS NOTE SCREEN

MENU 6

```
┌─────────────────────────────────────────────────────────────────┐
│ Text of note entered in this area. Each line ended by pressing  │
│ the <carriage return> key as on a typewriter.                   │
│                                                                 │
│                                                                 │
│                                                                 │
│                                                                 │
│                                                                 │
│                                                                 │
│                                                                 │
│                                                                 │
│                                                                 │
│                                                                 │
│                                                                 │
│                                                                 │
│ Enter Message, Press ESC key when done                          │
└─────────────────────────────────────────────────────────────────┘
```

MENU 7
TYPICAL GET NOTE SCREEN

```
┌─────────────────────────────────────────────────────────────────┐
│ Note Waiting from Leg 7                                         │
├─────────────────────────────────────────────────────────────────┤
│ Text of note displayed in this area.                            │
│                                                                 │
│                                                                 │
│                                                                 │
│                                                                 │
│                                                                 │
│                                                                 │
│                                                                 │
│                                                                 │
│                                                                 │
│                                                                 │
│                                                                 │
│ <P>rint,Scroll<F>orward,<B>ackward,or Press ESC key to Restore Command Menu │
└─────────────────────────────────────────────────────────────────┘
```

The next column of the menu identifies the conferee by name. The next column identifies the telephone number (including the 011 prefix, country and city codes for international calls) of the conferee. The next column indicates whether the conferee is on the talk mode, meaning two-way conversation. This is indicated by the word YES. If the word NO appears under the TALK column, this means that the conferee is in the listen-only mode and can only listen to the conversation and not talk over the line. If the word TALK appears under the TALK column, this means that the conferee has issued a "Request to TALK" command from his terminal. This is shown in MENU 5.

A last column after the TALK column labeled "SUB" appears if the conference has been divided into sub-conferences. This is shown in MENU 5.

As described earlier, a conferee must also have a login ID and password to connect his terminal to the service computer. The conferee then calls the service computer over the packet 40 to establish communication. Each conferee who accesses the service computer must respond to the service computer's prompt for a conference name or phone number. If a phone number is entered, the service computer assumes the conferee wants to monitor the conference which uses that phone number in its name. Conferees who access the service computer receive a status screen with a set of commands that are appropriate for conferees. A sample conferee screen is shown in MENU 4C.

The Conference Control Commands

At the bottom of the coordinator's status screen, eleven clear command descriptions are provided. The desired command may be selected by typing its first letter in response to the main status screen prompt: "Type First Letter of Action Desired (Listed Above):__". An important attribute of all of these commands (except Pass Note, Get Note, and Quit) is that they can be performed without losing the ability to monitor the status of the conference—unlike the ALLIANCE system's conferencing commands.

Each commands' function and usage is described below:

The "Add Conferee" command causes the bridge to dial out to a specified conferee and add them to the conference. After "A", the service computer prompts for the first name of the conferee, which must be typed in. The last name is then requested, which is also typed in. Finally, the telephone number is requested and this too is typed in by the coordinator. If the conference is presently sub-divided, then the service computer automatically prompts the coordinator to specify a sub-conference number for the conferee being added. These variable information responses are combined by the programming of the service computer with already stored constant information responses concerning the conference name, type, mode, segment, etc. These are all responses needed by the dedicated bridge, in addition to the name and telephone number of the conferee, to actually dial up and add the conferee. The programming of the service computer provides this mixture of variable and constant information responses to the bridge in the appropriate sequence. This minimizes the responses needed from the conference coordinator. A comparison of the ALLIANCE system's and the present invention's prompt/response dialogues needed to add a conferee is shown in Appendix I.

The "Telephone Add" function permits the addition of a conferee without having to specify his name. After typing the letter "T", the system computer requests the telephone number and this is typed in by the conference coordinator. A unique, yet arbitrary name is generated by the service computer (i.e., Aa Aaaa). A sub-conference designation will be prompted for if needed.

The "Directory Add Conferee" function is a particularly important function which is provided by the service computer and one which is not available using the ALLIANCE or other dedicated bridges. This function allows all coordinators to create separate conferee directories which are associated on a one-to-one basis with each PC-1000 conference name. Once created, all directories are stored in the service computer and can be edited or used at any time in the future. Using the Directory Add command, a coordinator may add conferees to a conference from its own directory either by:

1. Blasting-up all conferees at once, or;
2. Calling one, several, or all conferees one at a time at a rate determined by the coordinator.

To use the Directory Add function, the coordinator types "D" at the main status screen prompt. Since directories are associated on a one-to-one basis with the conference names, the service computer automatically chooses the appropriate directory. At the bottom of the status screen, the instructions "(A)dd, (D)elete, (B)lastup or (I)gnore?_" are displayed with the name and telephone number of the first entry in the directory. If there are no conferees entered in the directory yet, the "A" option is automatically executed by the system. Otherwise, by pressing "A", the coordinator can add a new individual to the directory. The information for the new individual is requested one field at a time. First name is requested, then last name, then telephone number.

By pressing "C", the service computer instructs the bridge to blastup the displayed entry and add him to the conference. The next directory entry is then automatically displayed. By pressing "S", the currently displayed entry is replaced by the next directory entry who has not been called yet. Both the "C" and "S" options may be performed repeatedly. Directory entries are displayed in the same order in which they are added.

This facilitates calling conferees in a predetermined order with little or no use of the (S)kip option. Pressing "D" causes the displayed entry to be deleted from the directory. Pressing "B", causes the service computer to instruct the bridge to simultaneously blast-up and add to the conference all directory entries who have not been called yet during this active conference.

Regardless of the method used to add conferees to the conference, the conference size indicators on the status screen "Legs 1 thru _ of _" and "Page 1 of _" are continuously updated.

The conference status screen has the capacity to display thirteen conferee legs at a time. For conferences with more than thirteen legs, additional display pages are created as required. A twelfth command called "Next page" then appears below the Quit command. Any time a status change occurs for a leg which is not currently displayed, the message "Status Change on leg _ page _" appears in the line above the command menu.

Conferees may pass a note or any ASCII-format text or data, between terminals with the "Pass Note to Conferee" command by typing "P". The service computer accomplishes this function by storing the note and forwarding it to all recipients designated by the sender. Once the instruction "P" has been entered, the service computer will return the note screen (MENU 6) to the conferee with the cursor at the upper left hand corner of the screen. The conferee may enter the text of his note by:

1. Typing it on his terminal keyboard. After entering each line, the conferee must press his carriage return (RETURN or ENTER key) to enter the next line, or;
2. Retrieving a file from any data storage device/media internal or external to the sender's terminal, or;
3. Loading it into the screen from any other ASCII character source, such as a text scanner.

To indicate the end of the note, the sender presses the "ESC" or ESCAPE key on his terminal. The service computer returns the status screen and the prompt "Enter Leg #'s, (C)oordinator, (A)ll or (I)gnore:". If the sender presses "A", all other conferees with terminals can retrieve the note. If the note is to be passed to one or more specific conferees, the leg number or numbers to whom the note is to go are typed, followed by a carriage return. The conferees who were sent the note receive the indication on their screen, "Note waiting from leg x" where "x" is also the sender's leg number (see MENU 5 for example). The sender also receives an indication of which conferees retrieve the note, "Note received by leg Y" where "Y" is the recipient's leg number. When all designated recipients have retrieved the note, the indication "Note delivered to all designations" is displayed on the sender's status screen (see MENU 4C for example).

To retrieve a note, the recipient presses "G" for the "Get Note from Conferee" command. The status screen is replaced by the Get Note Screen (MENU 7) and the note is displaced in the middle of this screen. The recipient can scroll through the note by using the instruction "F" for scroll forward or "B" for scroll backward. The note may also be printed or captured to any data storage device, internal or external, to a recipient's terminal by pressing "P". By pressing "ESC", the note is erased and the conferee's screen is returned to the status screen.

All conferences run on an ALLIANCE dedicated bridge end when all conferees have dropped. However, the coordinator may wish to use the "Hangup for Conferee" command to hang up (disconnect) one or all of the conferees. This may be done to remove a conferee from the conference, or to disconnect an unattended phone or other device from the conference. To execute this command, the letter "H" is pressed. This prompts "Enter Leg # to Hang up, (A)ll or (I)gnore:". The leg # of the conferee or the letter "A" is then pressed to either remove a specific conferee or to hang up on all conferees. When a specific conferee is selected by leg #, his name and telephone number is displayed on the bottom of the status screen. A prompt requested whether the information is correct is then displayed. The coordinator responds with a "Y" for yes or "N" for no. If "Y" is entered, the conferee(s) is disconnected and the status of that conferee(s) is changed from "ON CONF" to "DROPPED".

The "Subdivide Conference" command is used to subdivide the conference which allows voice communication only between conferees of a sub-conference. This command is started by typing "S". The service computer then requests whether one sub-conference will be split off. The coordinator responds with a "Y" or yes. If more than one sub-conference is to be formed, the coordinator responds with an "N" or no. In either case, the service computer then requests the coordinator to enter the leg numbers of those for the first sub-conference. This leaves the remaining conferees for the conference if only two conferences are to be provided. Otherwise, the coordinator must select leg numbers for each of the multiple sub-conferences.

Whenever a conference is subdivided, the "Subdivide Conference" command is replaced by "Undo Subdivide" on the command menu. The coordinator can rejoin all sub-conferences into a single conference by typing "U".

The coordinator can also change each conferee between Talk and Listen-Only modes by using the "Change Talk/Listen for Conferee" command. This is done by typing "C". This returns the prompt "Enter Leg # to change, (A)ll, or (I)gnore:". The coordinator then inputs the leg # of the conferee to be changed or the letter "A" to change the mode of all conferees.

A conferee who has dropped from the conference, either accidently, or on purpose (in the case where they originally had a noisy or inaudible connection), can be quickly added back to the conference using the "Redial Dropped Conferee" command.

To do this, the letter "R" is typed and the leg # of the conferee is entered in response to the service computer's prompt. The service computer, using information already available to it in the form of constant and variable information responses, runs through the ALBLASTUP command sequence with the dedicated bridge and updates that conferee's status to "REDIALING". When the conferee answers, his status is updated to "ON CONF".

It should be noted that the REDIAL option of the ALLIANCE system CALL command performs a different function than the present invention's "Redial Dropped Conferee" command. Recall that the ALLIANCE REDIAL option is used to redial a conferee in the attendant-assisted conference SETUP or CALL command modes. To add a dropped conferee, the ALLIANCE attendant must use the BLASTUP command, plus the "ADD Conferee to Conference" option.

The "Operator Call" function (initiated by the letter "O") will alert an operator, from the service center containing the service computer 42, to come on line. To maintain confidentiality, a flashing indication "OPERATOR ON CONFERENCE" will appear at the lower right hand corner of the status screen when the operator connects himself to the audio portion of the conference (see MENU 5).

Both the ALLIANCE attendant and service center operator can also be summoned by any conferee who depresses the "O" button for several seconds on his touch-tone phone. However, the present invention's "Operator Call" command has the advantage of summoning assistance without interrupting the voice conference.

The "QUIT" command permits the coordinator or conferee to disconnect his terminal from the conference while the audio portion of the conference continues.

Conferee Terminal Commands

Conferees with terminals on the conference have a limited variety of commands at their disposal (see MENU 4C). The Pass Note, Get Note, Operator Call, Next Page and Quit commands function the same as the coordinator's. In addition, the conferee has a "Request to Talk" command which can be used by the conferee to signal that they want to talk without interrupting the audio portion of the conference. This feature is most commonly used when the conferee has been placed in Listen-Only (TALK-"NO") mode by the coordinator, although it works in the Talk mode too.

Service Computer Capabilities

The present invention's service computer greatly expands the capacity of the conferee directory over the ALLIANCE system's directory. The present invention segregates its conferee data into multiple directories— each of which are associated with a particular conference name (as described earlier). Users cannot access or change each others conferee entries as Attendants can do with the ALLIANCE system. This allows each user to have confidential and secure directories.

Another major limitation of the ALLIANCE directory system is that duplicate conferee names, even though they may have different primary phone numbers, are not permitted. The service computer of the present invention overcomes this limitation by receiving the conferee name and the relevant telephone number as variable information, that is the information that falls into the second group of information responses to be used in conjunction with the ALLIANCE microprocessor, and reformatting this information using pseudonyms which are made up by the service computer (e.g., Aaa Bbb) to be used as a distinct name for a primary telephone number in the directory of the ALLIANCE microprocessor. Thus, users of the present invention may have multiple entries of the same conferee name, but with different telephone numbers, while the service computer conforms to the ALLIANCE system's requirement for distinct conferee names.

A further enhancement of this pseudonym technique allows conferee entries with the same name and same telephone number to exist in different directories. This is accomplished by the service computer creating a unique pseudonym based not only on the variable information, but also on the conference name that the directory belongs to. Since directories are associated on a one-to-one basis with conference names, different directories can have the same conferee name and telephone number entry in them.

Unlike the ALLIANCE system, the floating nature of the port which is actually used by a specific conferee during the course of a conference is not displayed to the coordinator or to any of the parties having terminals for monitoring the conference. Instead, the service computer automatically keeps track of the port for the purpose of interacting with the ALLIANCE microprocessor, and only displays the constant leg numbers in the menu screens supplied to the terminals.

The service computer is also programmed to provide billing information based on the filed carrier tariffs for telephone calls made by the bridge to each conferee, the duration that each conferee is on conference, and the duration of on-line service to each terminal. At the end of the conference, the conference coordinator is provided with the billing information on his terminal screen. Depending on the type of terminal and software used by the coordinator, this billing information may also be printed or captured to a file. As additional programming in the service computer, estimates can be made on the cost of a conference. These estimates are particularly useful if different bridges are available to the service computer. In this way, a cost estimate can be made for each bridge and even for combinations of different segments of each bridge to provide the coordinator with an indication of the least expensive bridge to use and the least expensive segment(s) of that bridge to use.

As another feature of the service computer, the programming is provided with logic that determines when only a single party of a conference remains. Upon this occurrence, the programming assumes the conference is at an end and disconnects the last party from communication with the bridge. This feature is used for pre-reserved (PC-2000) conferences only and may be selected to be active or inactive for each conference at the time its reservation is made.

In the following paragraphs, a preferred way of practicing the invention is disclosed:

The preferred embodiment for practicing the invention at the present time differs from the embodiment which has been disclosed above with regard to its conferee directory function. These differences include the following:

1. Conferee directories are not associated on a one-to-one basis with a single conference name. Conferee directories are associated with a user's ID number and password. In practice, this allows the first conferee to specify any phone number to start a conference and still be able to access any directory they may have created during a prior session. Thus, the person starting a conference that has not been pre-reserved is not limited in practice to participating from a single phone number or location.

2. Each user ID/password may now create up to 20 separate directories. After the user has entered a valid ID and password on his terminal, the service computer returns to the user, a Directory maintenance Screen (Menu 8). The user may add or delete conferees from any directory, add a new directory, erase an existing directory, start a conference, monitor a conference in progress, compute the least cost bridge to use, or view the conferees in an existing directory. For example, when the command "A" for "Add Conferees to a Directory" is entered, the user receives the prompt "Enter name or number of Directory or (I)gnore:" If the directory name or number entered does not have an existing directory associated with it, a new directory is created using that entry for its name. The chosen directory is then displayed in the middle of the maintenance screen and the user is prompted to enter a conferee first name, last name, and phone number. Once the phone number is entered, the user is prompted again for a conferee name and phone number. To stop adding conferees, the user types "I", which returns the main menu prompt "Type First Letter of Action Desired (Listed Above)". Conferees within a directory are sorted alphabetically by last name each time a conferee is added to the directory.

When a directory's size exceeds 9 conferees, an additional "Next Page" action command appears below the view command. The Next Page command allows the user to specify which page of the directory they wish to see. The most recent directory to have additions, deletions, or to be viewed, is known as the current directory.

MENU 8

TYPICAL DIRECTORY MAINTENENCE SCREEN

MENU 8
MAINTENENCE MENU

| Conferee Directories | | | |
|---|---|---|---|
| 1 board | 2 partners | 3 nat'l sales | 4 int'l sales |
| 5 purchasing | 6 warehouse | | |

| Directory: board | Conferees 1 thru 8 of 8 |
|---|---|
| 1  Alice    Abrams | (914) 683-4291 |
| 2  Mark     Carrol | (713) 555-2037 |
| 3  Jim      Jones | (212) 555-9203 |
| 4  Henry    Patterson | (718) 462-8804 |
| 5  Dick     Robinson | (316) 276-4608 |
| 6  Lloyd    Simon | (203) 858-3204 |
| 7  Ruth     Thompson | (303) 524-7619 |
| 8  Bob      Williams | (415) 555-5839 |

| | |
|---|---|
| Start or Monitor Conference | Add Conferees to a Directory |
| Quit(conference will continue | Delete Conferees from a Directory |
| Erase Directory | View the Conferees in a Directory |
| Compute Least Cost Bridge | |

Enter name or number of Directory or <I>gnore: ____

3. To perform "Compute the Least Cost Bridge" function, the coordinator types "C" from his maintenance menu screen. The coordinator is then prompted to specify the proposed date, start time and conferee directory to be used for a conference. Once these responses are entered the service computer computes the hypothetical telephone charges for each bridge to perform the conference, using the database of filed carrier tariffs. The programming for this computation assumes that all conferees in the specified directory will be blasted-up and that the conference duration will be approximately twenty minutes. The service computer displays, on the coordinator's terminal, the least cost bridge to use for the proposed conference. The cost of using the other bridge, as a percent of the least cost bridge, is also displayed.

4. To start a conference, the user enters the command "S". This command may be executed immediately if the conference directory to be used is already in existence or the coordinator wishes to start a conference by using the "Add Conferee" or "Telephone Add" commands from the conference control screen. The user is then prompted for his phone number or conference name, conference size, and bridge choice as described above.

To monitor a conference already in progress, the user also enters the command "S". However, when they enter the active conference's name or coordinator's phone number, as the case may be, the conference status screen immediately appears without further prompts.

5. The Directory Add function works in the same manner as described above, except that the user is first prompted to type the directory name or number they wish to use. The user may instead press his carriage return key to use the current directory without having to enter its name or number. Once the directory to use is chosen, the user receives a display of the first conferee in the directory, along with the instructions "(C)all, (S)kip, (A)dd, (D)elete, (B)last-up or (I)gnore?" as described above. It should be noted that a coordinator may add conferees to a conference from more than one directory.

6. The conference status screen has one additional command called "Maintenance Menu". When "M" is typed, the Directory Maintenance screen is presented to the coordinator for his use as shown in MENU 8. Any conference that is active when "M" is typed will continue. If the coordinator returns to view the conference status screen, the screen will reflect all changes in the conference that took place while the coordinator was using the directory maintenance menu.

The Conference Reservation System

As described above, the present invention is an on-demand conferencing system which combines the advantages of the ALLIANCE preset, adlib, and demand conferences into one integrated conferencing method. This method, as noted above, is referred to as "PC-1000". The present invention also embodies a pre-reserved conference reservation system which allows the service center operator to perform preset, meetme and four new conference types called: "Time-Start", "Auto-Combine", "Single-Meetme" and "Meetme-Start". These new conference types (PC-2000, as noted above) are hybrids created by combining existing ALLIANCE conference types and commands, and logic programmed into the service computer.

The Time-Start conference is a preset conference which blasts-up to all conferees in its chosen directory without coordinator assistance. The service computer has an additional field in its preset conference reservation screen which when set to "Yes" causes the service computer to initiate the conference at its reserved date and start time without a coordinator. The coordinator may monitor the active conference using the Start command on the Maintenance Menu Screen.

The Auto-Combine conference is a powerful new function which provides three practical capabilities to the present invention. Recall that in the ALLIANCE system, it is necessary for the Attendant to: Monitor the attendance of all conferences to be combined; manually execute the COMBINE command and; Perform additional future COMBINE, CALL, or BLASTUP commands to add each individual latecomer conferee to the combinor conference after the first COMBINE has been executed.

The present invention overcomes the drawbacks of the need for attendant monitoring, manual execution of the COMBINE command, and the need to manually add "latecomer" conferees to the combinor conference. This is accomplished by providing in the control computer's reservation system the ability to indicate in a combinee conference reservation the name of the combinor conference. This feature allows all combinee conferees to be automatically combined into the designated combinor conference—without attendant monitoring or assistance and irrespective of when any other combining activity has occurred between the associated combinor conference and combinee conferences (plural emphasized). If the combinor conference has not begun, the combinee conferences continue. Then, when the combinor conference starts, the combinee conferences are automatically combined into the combinor conference without operator assistance or interruption of any conferences.

The automatic combining of conferences is accomplished by the service computer performing the COMBINE command dialogue with the Alliance bridge microprocessor whenever the combinor and combinee conferences become simultaneously active.

The auto-combine function is particularly useful where one or more meetme conferees wish to dial into a conference at various time during that conference. In this case, every time a meetme conferee dials into the bridge and enters his touchtone code, the meetme conference becomes reactivated and is automatically combined with the ongoing conference. Thus, "latecomers" can be automatically made members of an ongoing conference without the service center operator or coordinator involvement.

A Single-Meetme is a meetme type conference which has only one conferee. Unlike an ALLIANCE meetme conference or the present invention's meetme conferences, the Single-Meetme has a specified conferee name and telephone number associated with its reservation. When a conferee dials into a bridge and enters the meetme code for his single-meetme conference, the specified conferee name and telephone number appears on the conference status screen. Thus, meetme conferees may be directly identifiable by name on the conference status screen simply by reserving each one in a single-meetme conference. Single-Meetme conferences are most often designated as combinee conferences. This allows individual meetme conferees to dial into the bridge at any time during a conference and be automatically combined into a combinor conference and be identified on the conference status screen by name and/or telephone number.

The Meetme-Start is another hybrid of the Auto-Combine type of conference. A Meetme-Start conference is an Auto-Combine conference where the preset conference is automatically blasted-up by the control computer when its associated Meetme conference starts. Recall that a Meetme conference starts when the first meetme conferee enters his or her four-digit meetme code. Once the first preset conferee who is blasted-up has answered his phone, the preset conference is active and the control computer issues commands to the bridge to combine the two conferences.

In summary, some of the important advantages of the present invention over other teleconferencing systems in general and the ALLIANCE system in particular include:

1. Eliminating the restrictions on the number of control means with access to a bridge, the number of bridges a given control means may access, and not requiring that the control means be limited to any specific locations.
2. Increasing the directory capacity of the system, segregating the directory system for different users, allowing duplicity of conferee data, and allowing a given directory or portion thereof, to be used on more than one bridge or conference.
3. Simplifying the execution of conferencing commands by requiring only variable information responses. for example, the "ADD CONFEREE" command.
4. Combining various bridge commands along with stored information responses and logic programmed into the service computer to create hybrid functions. For example, time-start or AUTO-COMBINE conferences.
5. Providing a real-time conference bill at the end of a conference.
6. Providing a means to estimate the least cost bridge to use for a proposed conference.
7. Providing a non-audio means for conferees to communicate with each other during a conference including requesting attention and exchanging data.

While a specific embodiment of the invention has been showed and described in detail to illustrate the application of the principles of the invention, it will be understood that the invention may be embodied otherwise without departing from such principles.

Two appendices follow which provide additional information concerning the present invention.

Appendix 1

ADDING A CONFEREE TO AN ACTIVE CONFERENCE

The following pages illustrate the steps required to add a conferee to an active conference using the ALLIANCE vs. the Present Invention's system. The steps required by each system to perform the conferee-add function are outlined on a summary page for each system. Each summary page is followed by several pages which show what the attendant/coordinator sees and enters on their terminal.

All screens illustrate the results of the response which was entered on the previous screen. For example, after "q" is entered on ALLIANCE Screen #1, the attendant sees the illustration shown on ALLIANCE Screen #2.

The actual source code for achieving the conferee-add function in the present invention's service computer is presented in appendix II.

| SUMMARY OF STEPS REQUIRED TO ADD A CONFEREE TO AN ACTIVE CONFERENCE USING THE ALLIANCE SYSTEM | | |
|---|---|---|
| ALLIANCE Prompt Displayed | Attendant (a.) Response Entered | ALLIANCE Sample Screen # |
| x OPTION: | quit | 1 |
| x COMMAND: | blastup | 2 |

SUMMARY OF STEPS REQUIRED TO ADD A CONFEREE TO AN ACTIVE CONFERENCE USING THE ALLIANCE SYSTEM -continued

|  |   |   |   |   |
|---|---|---|---|---|
|  | x | CONFERENCE NAME: | preset1 | 3 |
|  | x | CONFERENCE TYPE: | preset | 4 |
|  | x | NUMBER | \<carriage return\> | 5 |
|  | x | LAST NAME | carrol | 6 |
|  | x | FIRST NAME | mark | 7 |
|  | x | PHONE NUMBER | 7135552637 | 8 |
|  | x | SEGMENT | 2 | 9 |
|  | x | MODE OF CONFEREE: | talk | 10 |
| (b.) | x | SUBCONFERENCE NUMBER: | 2 | 11 |
|  | x | COMMAND: | monitor | 12 |
|  | X | CONFERENCE NAME: | preset1 | 13 |
|  | x | CONFERENCE TYPE: | preset | 14 |
|  |   | OPTION: |  | 15 |

Total Number of Responses = 14
Total Number of Keystrokes (boldface) = 12 plus
(excluding conferee name         2 × (conf. name length)
and telephone number)

Notes
x = Attendant cannot monitor conference during these steps.
(a.) Only lower case responses allowed.
(b.) This prompt only given when the conference has subconference assignments.

ADD A CONFEREE TO AN ACTIVE CONFERENCE
ALLIANCE SAMPLE SCREEN #1

| | NEXT Page | | QUIT Monitor Command | | |
|---|---|---|---|---|---|
| PORT | STATUS | NAME (a.) | PHONE NUMBER (b.) | MODE | SUB (c.) |
| 1 | ON CONF | john   smith | 4085559275 | T | 1 |
| 2 | ON CONF | bob    williams | 4155555839 | T | 2 |
| 3 | ON CONF | jim    jones | 2125559203 | T | 1 |
| (d.) | DROPPED | dick   robinson | 3162764608 | L | 1 |
| 5 | RINGING | ruth   thompson | 3035247619 | L | 2 |
| 6 | ON CONF | alice  abrams | 9146834291 | T | 1 |
| 4 | RINGING | henry  patterson | 7184628804 | T | 2 |
| 7 | RINGING | lloyd  simon | 2038583204 | T | 1 |
| 8 | RINGING | dick   robinson | 3162764600 | T | 1 |

OPTION: q

Notes:
(a.) Only lower case allowed.
(b.) No brackets, spaces, or dashes separate the numbers.
(c.) If subconference designations have been made, they appear in this column. When a conference is divided into subconferences an "*" appears next to the heading "SUB".
(d.) Port number erased when conferee drops.

ADD A CONFEREE TO AN ACTIVE CONFERENCE
ALLIANCE SAMPLE SCREEN #2

COMMAND: b1

ADD A CONFEREE TO AN ACTIVE CONFERENCE
ALLIANCE SAMPLE SCREEN #3

-continued

SUMMARY OF STEPS REQUIRED TO ADD A CONFEREE TO AN
ACTIVE CONFERENCE USING THE ALLIANCE SYSTEM

```
┌─────────────────────────────────────────────────────────┐
│                                                         │
│                                                         │
│                                                         │
│                                                         │
│                                                         │
│                                                         │
│                                                         │
│ CONFERENCE NAME: preset1                                │
└─────────────────────────────────────────────────────────┘
```

ADD A CONFEREE TO AN ACTIVE CONFERENCE

ALLIANCE SAMPLE SCREEN #4

```
┌─────────────────────────────────────────────────────────┐
│                                                         │
│                                                         │
│                                                         │
│                                                         │
│                                                         │
│                                                         │
│                                                         │
│ CONFERENCE TYPE: p                                      │
└─────────────────────────────────────────────────────────┘
```

ADD A CONFEREE TO AN ACTIVE CONFERENCE

ALLIANCE SAMPLE SCREEN #5

```
┌─────────────────────────────────────────────────────────┐
│  NUMBER    LAST NAME    FIRST NAME   PHONE NUMBER   SEG │
│  (c.r.)                                                 │
│                                                         │
│                                                         │
│                                                         │
│                                                         │
└─────────────────────────────────────────────────────────┘
```

(c.r.) = carriage return pressed

ADD A CONFEREE TO AN ACTIVE CONFERENCE

ALLIANCE SAMPLE SCREEN #6

-continued
SUMMARY OF STEPS REQUIRED TO ADD A CONFEREE TO AN
ACTIVE CONFERENCE USING THE ALLIANCE SYSTEM

| NUMBER | LAST NAME | FIRST NAME | PHONE NUMBER | SEG |
|--------|-----------|------------|--------------|-----|
| 0 | carrol | | | |

ADD A CONFEREE TO AN ACTIVE CONFERENCE
ALLIANCE SAMPLE SCREEN #7

| NUMBER | LAST NAME | FIRST NAME | PHONE NUMBER | SEG |
|--------|-----------|------------|--------------|-----|
| 0 | carrol | mark | | |

ADD A CONFEREE TO AN ACTIVE CONFERENCE
ALLIANCE SAMPLE SCREEN #8

| NUMBER | LAST NAME | FIRST NAME | PHONE NUMBER | SEG |
|--------|-----------|------------|--------------|-----|
| 0 | carrol | mark | 7135552637 | |

ADD A CONFEREE TO AN ACTIVE CONFERENCE
ALLIANCE SAMPLE SCREEN #9

| NUMBER | LAST NAME | FIRST NAME | PHONE NUMBER | SEG |
|--------|-----------|------------|--------------|-----|
| 0 | carrol | mark | 7135552637 | 2 |

-continued

SUMMARY OF STEPS REQUIRED TO ADD A CONFEREE TO AN ACTIVE CONFERENCE USING THE ALLIANCE SYSTEM

ADD A CONFEREE TO AN ACTIVE CONFERENCE
ALLIANCE SAMPLE SCREEN #10

| | LISTEN only conferee | | TWO WAY conferee | |
|---|---|---|---|---|
| NUMBER | LAST NAME | FIRST NAME | PHONE NUMBER | SEG |
| 0 | carrol | mark | 7135552637 | 2 |

MODE OF CONFEREE: t

ADD A CONFEREE TO AN ACTIVE CONFERENCE
ALLIANCE SAMPLE SCREEN #11

| NUMBER | LAST NAME | FIRST NAME | PHONE NUMBER | SEG |
|---|---|---|---|---|
| 0 | carrol | mark | 7135552637 | 2 |

SUBCONFERENCE NUMBER: 2

ADD A CONFEREE TO AN ACTIVE CONFERENCE
ALLIANCE SAMPLE SCREEN #12

COMMAND: mon

ADD A CONFEREE TO AN ACTIVE CONFERENCE
ALLIANCE SAMPLE SCREEN #13

-continued
SUMMARY OF STEPS REQUIRED TO ADD A CONFEREE TO AN ACTIVE CONFERENCE USING THE ALLIANCE SYSTEM

```
CONFERENCE NAME: preset1
```

ADD A CONFEREE TO AN ACTIVE CONFERENCE
ALLIANCE SAMPLE SCREEN #14

```
CONFERENCE TYPE: p
```

ADD A CONFEREE TO AN ACTIVE CONFERENCE
ALLIANCE SAMPLE SCREEN #15

| | NEXT Page | | QUIT Monitor Command | | |
|---|---|---|---|---|---|
| PORT | STATUS | NAME | PHONE NUMBER | MODE | SUB |
| 1 | ON CONF | john smith | 4085559275 | T | 1 |
| 2 | ON CONF | bob williams | 4155555839 | T | 2 |
| 3 | ON CONF | jim jones | 2125559203 | T | 1 |
| | DROPPED | dick robinson | 3162764608 | L | 1 |
| 5 | RINGING | ruth thompson | 3035247619 | L | 2 |
| 6 | ON CONF | alice abrams | 9146834291 | T | 1 |
| 4 | RINGING | henry patterson | 7184628804 | T | 2 |
| 7 | RINGING | lloyd simon | 2038583204 | T | 1 |
| 8 | RINGING | dick robinson | 3162764600 | T | 1 |
| 9 | RINGING | mark carrol | 7135552637 | T | 1 |

OPTION:

SUMMARY OF STEPS REQUIRED TO ADD A CONFEREE TO AN ACTIVE CONFERENCE USING THE PRESENT INVENTION

| Present Invention Prompt Displayed | Coordinator Response | Sample Screen # |
|---|---|---|
| Type First Letter of Action Desired: | A | 1 |
| Enter First Name or <I>gnore: | Mark | 2 |
| Enter Last Name or <I>gnore: | Carrol | 3 |
| Enter Phone Number or <I>gnore: | 7135552037 | 4 |
| (b.) Enter Subconference Number: | 2 | 5 |
| Type First Letter of Action Desired: | | 6 |

Total number of Responses = 5

Total Number of Keystrokes (boldface) = 2

SUMMARY OF STEPS REQUIRED TO ADD A CONFEREE TO AN ACTIVE CONFERENCE USING THE PRESENT INVENTION (excluding conferee name and telephone number)

Notes
(a.) Upper or lower case responses acceptable
(b.) Prompt only given when conference has subconference assignments.

Discussion

The "A" response causes the control computer to execute a subroutine which prompts the user for a conferee name and phone number (and subconference designation if required). Once the subroutine has received satisfactory responses, it obtains the proper conference-name, conference-type, and segment-number responses from its memory and begins a rapid sequential execution of the prompt/response dialogue with the bridge as described earlier in Appendix I. The "MODE OF CONFEREE:" response is always given a default value of "t" by this subroutine. The control computer begins and ends its dialogue with the bridge at the "COMMAND:" prompt. It is not necessary for the control computer to "see" the conference's status by using the monitor screen. Therefore, the control computer does not execute the quit, monitor, preset1, or preset responses shown earlier in Appendix I, which an attendant using the ALLIANCE system would normally perform.

ADD A CONFEREE TO AN ACTIVE CONFERENCE
PRESENT INVENTION SAMPLE SCREEN #1

| CONFERENCE: preset1 | | CONFERENCE CALL SERVICE ® 1986-87 CNE, Inc. | | Elapsed Time: 00:24:00 | |
|---|---|---|---|---|---|
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | YES | 2 |
| 3 | ON CONF | Jim Jones | (212) 555-9203 | YES | 1 |
| 4 | REDIALING | Dick Robinson | (316) 276-4608 | YES | 1 |
| 5+ | RINGING | Henry Patterson | (718) 462-8804 | YES | 2 |
| 6 | RINGING | Ruth Thompson | (303) 524-7619 | NO | 2 |
| 7+ | ON CONF | Alice Abrams | (914) 683-4291 | YES | 1 |
| 8 | ON CONF | Lloyd Simon | (203) 858-3204 | YES | 1 |
| Add Conferee Hangup for Conferee Subdivide Conference Telephone Add | | Pass Note to Conferee Get Note from Conferee Directory Add Conferee Redial Dropped Conferee | | Change Talk/Listen for Conferee Operator Call(CCS Cntrl Center) Quit(Conference will continue) | |
| LEGS 1 THRU 8 OF 8 | Page 1 of 1 | | | | |
| Type First Letter of Action Desired(Listed Above): A   (a.) | | | | | |

ADD A CONFEREE TO AN ACTIVE CONFERENCE
PRESENT INVENTION SAMPLE SCREEN #2

| CONFERENCE: preset1 | | CONFERENCE CALL SERVICE ® 1986-87 CNE, Inc. | | Elapsed Time: 00:24:05 | |
|---|---|---|---|---|---|
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | YES | 2 |
| 3 | ON CONF | Jim Jones | (212) 555-9203 | YES | 1 |
| 4 | REDIALING | Dick Robinson | (316) 276-4608 | YES | 1 |
| 5+ | RINGING | Henry Patterson | (718) 462-8804 | YES | 2 |
| 6 | RINGING | Ruth Thompson | (303) 524-7619 | NO | 2 |
| 7+ | ON CONF | Alice Abrams | (914) 683-4291 | YES | 1 |
| 8 | ON CONF | Lloyd Simon | (203) 858-3204 | YES | 1 |
| Add Conferee Hangup for Conferee Subdivide Conference Telephone Add | | Pass Note to Conferee Get Note from Conferee Directory Add Conferee Redial Dropped Conferee | | Change Talk/Listen for Conferee Operator Call(CCS Cntrl Center) Quit(Conference will continue) | |
| LEGS 1 THRU 8 OF 8 | Page 1 of 1 | | | | |
| Enter First Name or (I)gnore: Mark | | | | | |

ADD A CONFEREE TO AN ACTIVE CONFERENCE
PRESENT INVENTION SAMPLE SCREEN #3

-continued

| CONFERENCE: preset1 | | CONFERENCE CALL SERVICE | | Elapsed Time: 00:24:00 | |
|---|---|---|---|---|---|
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | YES | 2 |
| 3 | ON CONF | Jim Jones | (212) 555-9203 | YES | 1 |
| 4 | REDIALING | Dick Robinson | (316) 276-4608 | YES | 1 |
| 5+ | RINGING | Henry Patterson | (718) 462-8804 | YES | 2 |
| 6 | RINGING | Ruth Thompson | (303) 524-7619 | NO | 2 |
| 7+ | ON CONF | Alice Abrams | (914) 683-4291 | YES | 1 |
| 8 | ON CONF | Lloyd Simon | (203) 858-3204 | YES | 1 |

| Add Conferee | Pass Note to Conferee | |
|---|---|---|
| Hangup for Conferee | Get Note from Conferee | Change Talk/Listen for Conferee |
| Subdivide Conference | Directory Add Conferee | Operator Call(CCS Cntrl Center) |
| Telephone Add | Redial Dropped Conferee | Quit(Conference will continue) |

LEGS 1 THRU 8 OF 8    Page 1 of 1

Enter Last Name or (I)gnore: Carrol

ADD A CONFEREE TO AN ACTIVE CONFERENCE
PRESENT INVENTION SAMPLE SCREEN #4

| CONFERENCE: preset1 | | CONFERENCE CALL SERVICE | | Elapsed Time: 00:24:10 | |
|---|---|---|---|---|---|
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | YES | 2 |
| 3 | ON CONF | Jim Jones | (212) 555-9203 | YES | 1 |
| 4 | REDIALING | Dick Robinson | (316) 276-4608 | YES | 1 |
| 5+ | RINGING | Henry Patterson | (718) 462-8804 | YES | 2 |
| 6 | RINGING | Ruth Thompson | (303) 524-7619 | NO | 2 |
| 7+ | ON CONF | Alice Abrams | (914) 683-4291 | YES | 1 |
| 8 | ON CONF | Lloyd Simon | (203) 858-3204 | YES | 1 |

| Add Conferee | Pass Note to Conferee | |
|---|---|---|
| Hangup for Conferee | Get Note from Conferee | Change Talk/Listen for Conferee |
| Subdivide Conference | Directory Add Conferee | Operator Call(CCS Cntrl Center) |
| Telephone Add | Redial Dropped Conferee | Quit(Conference will continue) |

LEGS 1 THRU 8 OF 8    Page 1 of 1

Enter Telephone Number or (I)gnore: 7135552037

ADD A CONFEREE TO AN ACTIVE CONFERENCE
PRESENT INVENTION SAMPLE SCREEN #5

| CONFERENCE: preset1 | | CONFERENCE CALL SERVICE | | Elapsed Time: 00:24:15 | |
|---|---|---|---|---|---|
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | YES | 2 |
| 3 | ON CONF | Jim Jones | (212) 555-9203 | YES | 1 |
| 4 | REDIALING | Dick Robinson | (316) 276-4608 | YES | 1 |
| 5+ | RINGING | Henry Patterson | (718) 462-8804 | YES | 2 |
| 6 | RINGING | Ruth Thompson | (303) 524-7619 | NO | 2 |
| 7+ | ON CONF | Alice Abrams | (914) 683-4291 | YES | 1 |
| 8 | ON CONF | Lloyd Simon | (203) 858-3204 | YES | 1 |

| Add Conferee | Pass Note to Conferee | |
|---|---|---|
| Hangup for Conferee | Get Note from Conferee | Change Talk/Listen for Conferee |
| Subdivide Conference | Directory Add Conferee | Operator Call(CCS Cntrl Center) |
| Telephone Add | Redial Dropped Conferee | Quit(Conference will continue) |

LEGS 1 THRU 8 OF 8    Page 1 of 1

Enter Subconference Number: 2

ADD A CONFEREE TO AN ACTIVE CONFERENCE

-continued
PRESENT INVENTION SAMPLE SCREEN #6

| CONFERENCE: preset1 | | CONFERENCE CALL SERVICE ® 1986-87 CNE, Inc. | | Elapsed Time: 00:24:00 | |
|---|---|---|---|---|---|
| LEG | STATUS | CONFEREE NAME | TELEPHONE | TALK | SUB |
| 1+ | ON CONF | John Smith | (408) 555-9275 | YES | 1 |
| 2 | ON CONF | Bob Williams | (415) 555-5839 | YES | 2 |
| 3 | ON CONF | Jim Jones | (212) 555-9203 | YES | 1 |
| 4 | REDIALING | Dick Robinson | (316) 276-4608 | YES | 1 |
| 5+ | RINGING | Henry Patterson | (718) 462-8804 | YES | 2 |
| 6 | RINGING | Ruth Thompson | (303) 524-7619 | NO | 2 |
| 7+ | ON CONF | Alice Abrams | (914) 683-4291 | YES | 1 |
| 8 | ON CONF | Lloyd Simon | (203) 858-3204 | YES | 1 |
| 9 | RINGING | Mark Carrol | (713) 555-2037 | YES | 1 |
| Add Conferee Hangup for Conferee Subdivide Conference Telephone Add | | Pass Note to Conferee Get Note from Conferee Directory Add Conferee Redial Dropped Conferee | | Change Talk/Listen for Conferee Operator Call(CCS Cntrl Center) Quit(Conference will continue) | |
| LEGS 1 THRU 9 OF 9   Page 1 of 1 | | | | | |
| Type First Letter of Action Desired (listed above): ____ | | | | | |

NOTES:
— Plus "+" sign indicates conferee has a terminal connected.
(a.) Status screen remains active while prompt/response dialogue takes place in this area of the screen.

Appendix II
EXAMPLES OF SOURCE CODE

The following pages are reproductions of five sections of source code which the service computer is programmed with. These are provided as representatives of how some of the functions of the service computer can be achieved. The other functions can all be programmed in similar fashion by a computer programmer having ordinary skill in the field.

The sub-routine entitled "dsp_cmds.c" displays a menu of valid functions on a terminal connected to the service computer. The bottom of the second page of that sub-routine shows the various commands available to the coordinator. KEYCMD c_add is the definition that says to execute add_conferee when the symbol "a" is pressed.

The sub-routine "add_conf.c" allows the coordinator to add a conferee to a conference. This sub-routine obtains the first name, last name and telephone number of the conferee and executes b_add (the third page of the sub-routine). The definition b_add executes bq_snd using the dialogue steps which are shown on a separate page entitled "DIALOGUE STEPS". These dialogue steps are incorporated in another sub-routine which is not shown here. The sub-routine bq_snd places the dialogue with the name and telephone number on the bridge queue where the dialogue is sent to the appropriate bridge via a dataline.

The sub-routine "add_one.c" and "add_line.c" adds the conferee information to the internal tables used for the status display and saves the conferee information in a table.

```
/*************************************************
* dsp_cmds.c  -  display function menus
* Copyright (c) 1986-1987 Communications Network Enhancement Inc.
*
* SUMMARY:
*      Displays the menu of valid functions.
*
* REVISION HISTORY:
*
*    Date       Version    By      Purpose of Revision
*    --------   -------    -----   ------------------------
*    05-01-87   1.00       WJK     Initial Draft
*    05-26-87   1.01       WJK     Add support for maintenance menu
*    08-17-87   3.10       WJK     Add Erase Directory command to maintenance menu
*    10-28-87   3.36       WJK     Add least cost option to maintenance menu
*
*************************************************/

/* include files
*/
#include "../include/tty.h"
#include "../include/ccs.h"
#include "../include/cust.h"

/* define declarations
*/
/* Columns for coordinator and operator commands */ define CCOL1  0         /* first column is 20 characters wide */
define CCOL2  22        /* second column is 23 characters wide */
#define CCOL3  47        /* third column is 33 characters wide */
```

```
/* Columns for conferee commands */ define SCOL1 0         /* first column is 38 characters wide */
define SCOL2 40        /* second column is 38 characters wide */

/* Colums for maintenance commands */ define MCOL1 0         /* first column is 38 characters wide */
define MCOL2 40        /* second column is 38 characters wide */

* external function references
*/
int pr_cmd(), next_page(), add_conferee(), diradd_conferee(), redial(),
    divide(), join(), call_operator(), pass_note(), get_note(), teladd(),
    rotalk(), give(), take(), onconf(), offconf(), listen(), maint_screen(),
    start(), add_to_directory(), delete_from_directory(), view_directory(),
    erase_directory(), cost_directory();
void dsp_cmds(), select_cmds();

* external data references
*/
extern short n_page, mode, user, screen;
extern KEYCMD **cmds;
extern char blankline[];

/* static (local) declarations
*/

/* Commands */ static char p_add[] =           "Add Conferee";
static char p_addc[] =          "Add Conferees to a Directory";
static char p_change[] =        "Change Talk/Listen for Conferee";
static char p_cost[]=           "Compute Least Cost Bridge";
static char p_delc[] =          "Delete Conferees from a Directory";
static char p_diradd[] =        "Directory Add Conferee";
static char p_divide[] =        "Subdivide Conference";
static char p_erase[] =         "Erase Directory";
static char p_get[] =           "Get Note from Conferee";
static char p_give[] =          "Yield Conference Control";
static char p_hang[] =          "Hangup for Conferee";
static char p_join[] =          "Undo Sub-divide";
static char p_listen[] =        "Listen to Legs";
static char p_maint[] =         "Maintenance Menu";
static char p_next[] =          "Next Page";
static char p_off[] =           "Off Conference or Leg";
static char p_on[] =            "On Conference or Leg ";
static char p_operator[] =      "Operator Call (CCS Cntrl Center)";
static char p_pass[] =          "Pass Note to Conferee";
static char p_quit[] =          "Quit (conference will continue)";
static char p_redial[] =        "Redial Dropped Conferee";
static char p_start[] =         "Start or Monitor Conference";
static char p_take[] =          "Take Conference Control";
static char p_talk[] =          "Request to Talk";
static char p_teladd[] =        "Telephone Add";
static char p_view[] =          "View the Conferees in a Directory";

/* Coordinator commands */ static KEYCMD c_add = {'A', YES, 0, CCOL1, p_add, add_conferee};
static KEYCMD c_hang = {'H', YES, 1, CCOL1, p_hang, pr_cmd};
static KEYCMD c_divide = {'S', YES, 2, CCOL1, p_divide, divide};
static KEYCMD c_join = {'U', YES, 2, CCOL1, p_join, join};
static KEYCMD c_teladd = {'T', YES, 3, CCOL1, p_teladd, teladd};

static KEYCMD c_pass = {'P', YES, 0, CCOL2, p_pass, pass_note};
static KEYCMD c_get = {'G', YES, 1, CCOL2, p_get, get_note};
static KEYCMD c_diradd = {'D', YES, 2, CCOL2, p_diradd, diradd_conferee};
static KEYCMD c_redial = {'R', YES, 3, CCOL2, p_redial, redial};

static KEYCMD c_change = {'C', YES, 0, CCOL3, p_change, pr_cmd};
static KEYCMD c_operator = {'O', YES, 1, CCOL3, p_operator, call_operator};
static KEYCMD c_maint = {'M', YES, 2, CCOL3, p_maint, maint_screen};
static KEYCMD c_quit = {'Q', YES, 3, CCOL3, p_quit, NULL};
static KEYCMD c_next = {'N', YES, 4, CCOL3, p_next, next_page};
```

```c
static KEYCMD *c_cmds[] = {&c_add, &c_hang, &c_divide, &c_join, &c_teladd,
        &c_pass, &c_get, &c_diradd, &c_redial, &c_change,
        &c_operator, &c_maint, &c_quit, &c_next, NULL};

/* Controling Operator commands */ static KEYCMD o_add    = {'A', YES, 0, CCOL1, p_add, add_conferee};
static KEYCMD o_hang   = {'H', YES, 1, CCOL1, p_hang, pr_cmd};
static KEYCMD o_divide = {'S', YES, 2, CCOL1, p_divide, divide};
static KEYCMD o_join   = {'U', YES, 2, CCOL1, p_join, join};
static KEYCMD o_teladd = {'T', YES, 3, CCOL1, p_teladd, teladd};
static KEYCMD o_listen = {'L', YES, 4, CCOL1, p_listen, listen};
static KEYCMD o_pass   = {'P', YES, 0, CCOL2, p_pass, pass_note};
static KEYCMD o_get    = {'G', YES, 1, CCOL2, p_get, get_note};
static KEYCMD o_diradd = {'D', YES, 2, CCOL2, p_diradd, diradd_conferee};
static KEYCMD o_redial = {'R', YES, 3, CCOL2, p_redial, redial};
static KEYCMD o_on     = {'O', YES, 4, CCOL2, p_on, onconf};
static KEYCMD o_off    = {'O', NO,  4, CCOL2, p_off, offconf};
static KEYCMD o_next   = {'N', YES, 0, CCOL3, p_next, next_page};
static KEYCMD o_change = {'C', YES, 1, CCOL3, p_change, pr_cmd};
static KEYCMD o_give   = {'Y', YES, 2, CCOL3, p_give, give};
static KEYCMD o_maint  = {'M', YES, 3, CCOL3, p_maint, maint_screen};
static KEYCMD o_quit   = {'Q', YES, 4, CCOL3, p_quit, NULL};

static KEYCMD *o_cmds[] = {&o_add, &o_hang, &o_divide, &o_join, &o_teladd,
        &o_listen, &o_pass, &o_get, &o_diradd, &o_redial, &o_on, &o_off,
        &o_next, &o_change, &o_give, &o_maint, &o_quit, NULL};

/* Conferee commands */ static KEYCMD s_pass = {'P', YES, 0, SCOL1, p_pass, pass_note};
static KEYCMD s_get  = {'G', YES, 1, SCOL1, p_get, get_note};
static KEYCMD s_next = {'N', YES, 2, SCOL1, p_next, next_page};
static KEYCMD s_talk = {'R', YES, 3, SCOL1, p_talk, rqtalk};
static KEYCMD s_quit = {'Q', YES, 0, SCOL2, p_quit, NULL};

static KEYCMD *s_cmds[] = {&s_pass, &s_get, &s_next, &s_talk, &s_quit, NULL};

/* Monitoring Operator commands */ static KEYCMD m_pass = {'P', YES, 0, SCOL1, p_pass, pass_note};
static KEYCMD m_get  = {'G', YES, 1, SCOL1, p_get, get_note};
static KEYCMD m_next = {'N', YES, 2, SCOL1, p_next, next_page};
static KEYCMD m_take = {'T', YES, 3, SCOL1, p_take, take};
static KEYCMD m_quit = {'Q', YES, 0, SCOL2, p_quit, NULL};

static KEYCMD *m_cmds[] = {&m_pass, &m_get, &m_next, &m_take, &m_quit, NULL};

/* Maintenance commands  (used by operator and coordinator) */ static KEYCMD x_start = {'S', YES, 1, MCOL1, p_start, start};
static KEYCMD x_quit  = {'Q', YES, 2, MCOL1, p_quit, NULL};
static KEYCMD x_erase = {'E', YES, 3, MCOL1, p_erase, erase_directory};
static KEYCMD x_cost  = {'C', YES, 4, MCOL1, p_cost, cost_directory};
static KEYCMD x_addc  = {'A', YES, 1, MCOL2, p_addc, add_to_directory};
static KEYCMD x_delc  = {'D', YES, 2, MCOL2, p_delc, delete_from_directory};
static KEYCMD x_view  = {'V', YES, 3, MCOL2, p_view, view_directory};

static KEYCMD *x_cmds[] = {&x_start, &x_quit, &x_erase, &x_cost,
                           &x_addc, &x_delc, &x_view, NULL};

/****************************************************************
 * void dsp_end();
 *
 *      Display function menu and conference status line.
 *
 * Usage notes:
 *
 * Returns:
 *      Nothing.
 *
 ****************************************************************/
void dsp_end()
    {
    dsp_cmds();
    dsp_status();
    }
```

```
/************************************************************************
 * void dsp_cmds()
 *
 *      Display the menu of currently valid functions.
 *
 * Usage notes:
 *
 * Returns:
 *      Nothing.
 *
 ************************************************************************/ void dsp_cmds()
    {
    KEYCMD **k;
    int win;

win = screen == MAINTENANCE ? W_MCMDS : W_CMDMENU;
    w_clr(win);
/* set coordinator options */
    c_divide.enabled = ((mode & 1) == 1);
    c_join.enabled   = ((mode & 1) == 0);
    c_next.enabled   = (n_page > 1);

/* set control operator options */
    o_divide.enabled = ((mode & 1) == 1);
    o_join.enabled   = ((mode & 1) == 0);
    o_next.enabled   = (n_page > 1);

/* set conferee options */
    s_next.enabled = (n_page > 1);

/* set monitor operator options */
    m_next.enabled = (n_page > 1);

select_cmds();
    if (screen == MAINTENANCE)
        w_wr(win, 0, 0, blankline, REVERSE);
    for (k = cmds; *k; ++k)
        if ((*k)->enabled && (*k)->description)
            w_wr(win, (*k)->col, (*k)->row, (*k)->description, HFIRST);
    if (screen == MAINTENANCE)
        w_wr(win, 0, 5, blankline, REVERSE);
    } void select_cmds()
    {
    if (screen == MAINTENANCE)
        cmds = x_cmds;
    else if (user == COORDINATOR)
        cmds = c_cmds;
    else if (user == CONFEREE)
        cmds = s_cmds;
    else if (user == MONITOR_OPERATOR)
        cmds = m_cmds;
    else if (user == CONTROL_OPERATOR)
        cmds = o_cmds;
    }

/************************************************************************
 * void dsp_onoff(on)
 *      int on;         - operator is on conference
 *
 *      Displays description of the function (several lines) >
 *
 * Usage notes:
 *
 * Returns:
 *      Nothing.
 *
 ************************************************************************/
```

```c
:so_onoff(on)
    int on;     /* operator is ON */
    {
    if (on == NO)
        {
        o_on.enabled = YES;
        o_off.enabled = NO;
        w_wr(W_CMDMENU, o_on.col, o_on.row, o_on.description, HFIRST);
        }
    else
        {
        o_off.enabled = YES;
        o_on.enabled = NO;
        w_wr(W_CMDMENU, o_off.col, o_off.row, o_off.description, HFIRST);
        }
    }
/****************************************************************
 * add_conf.c - add conferee to conference
 * Copyright (c) 1986-1987 Communications Network Enhancement Inc.
 *
 * SUMMARY:
 *      Gets conferee data from user and asks br_xmit to call the
 *      conferee and add him to the conference.
 *
 * REVISION HISTORY:
 *
 *   Date       Version    By     Purpose of Revision
 *   --------   -------    ---    -------------------------------
 *   05-01-87    1.00      WJK    Initial Draft
 *   08-25-87    3.16      WJK    Require user to ack. 'too many adds' message
 *   09-02-87    3.19      WJK    PC1000s with Meetme Capabilities
 *
 ****************************************************************/

/* include.files
 */
#include "../include/ccs.h"
#include "../include/msgtyp.h"
#include "../include/spa.h"
#include "../include/cust.h"
#include "../include/ttv.h"

/* external function references
 */
char *strcpy(), *full_name();
void b_add();

/* external data references
 */
extern int qid;
extern CNF_SPA *cnf_spa, *csp;
extern short mode;
extern SAV_TAB *ptab;
extern char p_first[], p_last[], p_tele[], p_e_subconf[], too_many_adds[];

/****************************************************************
 * void add_conferee()
 *
 *      Gets the conferee's name and phone number from the user and
 *      asks br_xmit to call him and add him to the conference.
 *
 * Usage notes:
 *
 * Returns:
 *      Nothing.
 *
 ****************************************************************/ void add_conferee()
    {
    PNAME pname;
    PHONE phone;
```

```
    char lname[L_LAST_NAME + 1], fname[L_FIRST_NAME + 1];

if (!add_ok())
        return;
/* input first name */
    if (inp_char(p_first, fname, L_FIRST_NAME, ALPH) < 0)
        return;
/* input last name */
    if (inp_char(p_last, lname, L_LAST_NAME, ALPH) < 0)
        return;
    full_name(pname, fname, lname);
    if (srch_tab(pname) > 0)
        {
        dsp_error("Conferee Already Active -- Press Return to Continue");
        return;
        }
/* input telephone number */
    if (inp_char(p_tele, phone, L_PHONE_NUM, TELE_NUM) < 0)
        return;
    b_add(pname, phone);
    }

/***************************************************************
 * int add_ok()
 *
 *     Check if a conferee can be added to the conference.
 *
 * Usage notes:
 *
 * Returns:
 *     NO    - adding a conferee would exceed the reservation
 *     YES   - adding a conferee is OK
 *
 ***************************************************************/ int add_ok()
    {
    if (csp->ports <= csp->r_ports + 3)
        return (YES);
    dsp_error(too_many_adds);
    return (NO);
    }

/***************************************************************
 * void b_add(pname, phone)
 *     char *pname;     - conferee's name
 *     char *phone;     - conferee's telephone number
 *
 *     Adds a conferee to the conference.
 *
 * Usage notes:
 *
 * Returns:
 *     Nothing.
 *
 ***************************************************************/ void b_add(pname, phone)
    char *pname, *phone;
    {
    ALIAS aname;
    MSG msg;
    int sub;

if ((sub = div_add()) < 0)
        return;
    msg.m.b_add.confid = csp->confid;
    msg.mtype = B_ADD;
    alias_temp(aname);
    msg.m.b_add.lix = add_lix(csp, pname, aname, phone, MD_TWOWAY, sub);
    if ((bq_snd(&msg, sizeof(msg.m.b_add))) < 0)
        err_msg(MSGSND_ERR);
    }
```

```
/****************************************************************
 * int inp_char(pmt, buffer, len, type_char)
 *      char *pmt;        - prompt to be displayed
 *      char *buffer;     - input data will be put here
 *      int len;          - size of buffer
 *      int type_char;    - type of data to input
 *
 *      Prompts the user for input and performs low level validation
 *      of the input.
 *
 * Usage notes:
 *
 * Returns:
 *      0         - got good data from user
 *      -1        - user entered <I>gnore
 *      -2        - user entered <A>ll
 *      -3        - user entered <O>perator
 *
 ****************************************************************/ int inp_char(pmt, buffer, len, type_char)
    char *pmt;              /* prompt to be displayed */
    char *buffer;           /* input buffer */
    int len;                /* maximum number of characters to input */
    int type_char;          /* type of input */
    {
    int xp, ret;
    char *s;

*buffer = '\0';
    while (*buffer == '\0')
        {
        xp = prompt(pmt, YES);
        ret = get_message(W_PROMPT, xp, 0, buffer, len, type_char);
        if (ret == 0 && type_char == TELE_NUM && strlen(buffer) < 7)
            {
            *buffer = '\0';
            dsp_remark(" Telephone number must be at least 7 digits ");
            }
        }
    for (s = buffer + strlen(buffer) - 1; s >= buffer && iswhite(*s); --s)
        *s = '\0';
    for (s = buffer; iswhite(*s); ++s)
        ;
    strcpy(buffer, s);
    return (ret);
    }
/****************************************************************
 * int div_add()
 *
 *      Get the sub-conference number for a conferee to be added.
 *      If the confrence is currently divided or is in the process of
 *      being divided, asks the user to select the sub-conference
 *      that the new conferee should be added to.
 *
 * Usage notes:
 *
 * Returns:
 *      -1        - user entered <I>gnore
 *      0         - conference hasn't been sub-divided
 *      other     - sub-conference number
 *
 ****************************************************************/
int div_add()
    {
    int xp, num;
    char buffer[10];

if (mode == DIVIDE || mode == PEND_DIVIDE)
        {
        xp = prompt(p_e_subconf, YES);
        for (;;)
            {
```

```
            if (get_message(W_PROMPT, xp, 0, buffer, 3, NUMERIC) < 0)
                return (-1);
            num = br_sub(atoi(buffer));
            if (num != 0)
                return (num);
            dsp_remark("Sub Conference Number Is Not Defined");
            }
        }
    return (csp->divide ? 1 : 0);
    }
/****************************************************************
* int bq_snd(mp, n)
*       MSG *mp;          - message
*       int n;            - size of message
*
*       Send a message to the bridge using the least busy leg.>
* Usage notes:
* Returns:
*       -1        - couldn't send message
*        0        - sent message
****************************************************************/
int bq_snd(mp, n)
    MSG *mp;
    int n;
    {
    TTY_SPA *ysp, *bq;
    int backlog, min_backlog, i, sts;
    min_backlog = 0x7fffffff;
    bq = NULL;
    for (i = 0; i < nleg; ++i)
        {
        ysp = leg[i];
        if (ysp->status != TS_ACTIVE)
            continue;
        if (ysp->attached)
            {
            if (bq == NULL)
                bq = ysp;
            continue;
            }
        if ((backlog = qfull(ysp->qid)) == 0)
            {
            bq = ysp;
            break;
            }
        if (backlog < min_backlog)
            {
            min_backlog = backlog;
            bq = ysp;
            }
        }
    if (bq == NULL)
        return (-1);
    sts = a_msgsnd(bq->qid, mp, n, 0);
    return (sts);
    }
```

DIALOGUE STEPS

```
DIALOGUE blastup[] = {              DIALOGUE blastup_sub[] = {
    (NULL, "b\n"),                      (NULL, "b\n"),
    (NULL, cname),                      (NULL, cname),
    (NULL, ctype),                      (NULL, ctype),
    (NULL, lname),                      (NULL, lname),
    (NULL, fname),                      (NULL, fname),
    (NULL, phone),                      (NULL, phone),
    (NULL, "1\n"),                      (NULL, "1\n"),
    (NULL, mode),                       (NULL, mode),
    (&conf_nam, NULL),                  (NULL, sub),
    (&conf_typ, NULL),                  (&conf_nam, NULL),
    (&last_nam, NULL),                  (&conf_typ, NULL),
    (&first_nam, NULL),                 (&last_nam, NULL),
    (&phone_num, NULL),                 (&first_nam, NULL),
    (&seg_num1, NULL),                  (&phone_num, NULL),
    (&mode_conf, NULL),                 (&seg_num1, NULL),
                                        (&mode_conf, NULL),
                                        (&sub_conf1, NULL),
    (NULL, NULL)};                      (NULL, NULL)};
```

```
/************************************************************************
 * add_line.c - add a new line to conference
 * Copyright (c) 1986-1987 Communications Network Enhancement Inc.
 *
 * SUMMARY:
 *      Adds a new line to the conference when a new conferee is
 *      connected to the conference.
 *
 * REVISION HISTORY:
 *
 *   Date      Version   By    Purpose of Revision
 *   --------  -------   ---   ---------------------------------------
 * 05-01-87    1.00      WJK   Initial Draft
 *
 ************************************************************************/
/* include files
 */
#include "../include/ccs.h"
#include "../include/msgtyp.h"
#include "../include/tty.h"
#include "../include/cust.h"

/* external data references
 */
extern short n_page, n_conf;
extern int nlines;
/************************************************************************
 * void cs_add_line(pm)
 *      struct m_onconf *pm;    - on conference message
 *
 *      Adds a new line to the internal tables used to maintain the
 *      status display.
 *
 * Usage notes:
 *
 * Returns:
 *      Nothing.
 *
 ************************************************************************/
void cs_add_line(pm)
    struct m_onconf *pm;        /* pointer to onconf message */
    {
    short lnum = n_page;

err_push("add_line");
    add_tab();
    add_one(pm);
    n_page = (n_conf - 1) / nlines + 1;
    if (lnum == 1 && n_page > 1)
        dsp_end();
    upd_status(C_ONCONF);
    err_pop();
    }
/************************************************************************
 * add_one.c - add entry to SAV_TAB list
 * Copyright (c) 1986-1987 Communications Network Enhancement Inc.
 *
 * SUMMARY:
 *      Adds an entry to the SAV_TAB list when a new conferee joins the
 *      conference.
 *
 * REVISION HISTORY:
 *
 *   Date      Version   By    Purpose of Revision
 *   --------  -------   ---   ---------------------------------------
 * 05-01-87    1.00      WJK   Initial Draft
 *
 ************************************************************************/
/* include files
 */
#include "../include/ccs.h"
#include "../include/msgtyp.h"
#include "../include/spa.h"
#include "../include/cust.h"
```

```
/* external function references
 */
char *strcpy();
void chk_tix();

/* external data references
 */
extern SAV_TAB *ctab, *mytab;
extern CNF_SPA *csp;
extern short cix, myline;
extern TTY_SPA *ysp;
extern char myname[];

/***********************************************************************
 * void add_one(p)
 *      struct m_onconf *p;     - new conferee data
 *
 *      Fills in the ctab entry in the SAV_TAB with the information
 *      about the new conferee.
 *
 * Usage notes:
 *
 * Returns:
 *      Nothing.
 *
 ***********************************************************************/
void add_one(p)
    struct _c_onconf *p;        /* pointer to onconf message */
    {
    strcpy(ctab->pname, p->pname);
    strcpy(ctab->phone, p->phone);
    ctab->mode = p->mode;
    ctab->old_mode = p->mode;
    ctab->port = p->port;
    ctab->line = p->line;
    ctab->tix = NOTIX;
    ctab->status = p->status;
    ctab->sub = p->sub;
    ctab->lix = p->lix;
    chk_tix();
    }
/***********************************************************************
 * void chk_tix()
 *
 *      Checks if the newly added conferee is the same person who is
 *      logged in using this process.
 *
 * Usage notes:
 *
 * Returns:
 *      Nothing.
 *
 ***********************************************************************/
void chk_tix()
    {
    MSG msg;
    int i;

if (myname[0] && strcmp(myname, ctab->pname) == 0)
        {
        myline = ctab->line;
        mytab = ctab;
        for (i = 0; i < spa_hdr->line_spa; ++i)
            if (line_spa[i].cix == cix && line_spa[i].line == myline)
                line_spa[i].tix = ysp - tty_spa;
        ctab->tix = ysp - tty_spa;
        msg.mtype = C_LOGSTS;
        msg.m.c_logsts.line = myline;
        msg.m.c_logsts.tix = ysp - tty_spa;
        sendmsg(cix, &msg, sizeof(msg.m.c_logsts));
        }
    }
```

The invention claimed is:

1. A method for operating a teleconferencing system, the system having a bridge with a plurality of ports, each for communication with a party and control means responsive to a plurality of commands and a plurality of information responses for each command, said plurality of information responses including a first group and a second group, the control means responding to reformatted information responses of the second group of information responses, the bridge being controlled to execute function according to the commands and in response to inputting of information responses into the control means, the method comprising:

connecting a service computer to the control means for issuing commands thereto for causing the bridge to execute functions corresponding to the commands;

storing in the service computer, the first group of information responses;

inputting into the service computer the second group of information responses;

issuing a selected command from the service computer to the control means for initiating a function corresponding to the selected command;

reformatting at least some of the second group of information responses; and supplying the first, any unreformatted second and the reformatted second groups of information responses to the control means for completing the function corresponding to the selected command, from the service computer.

2. A method according to claim 1, including connecting at least one first user terminal to the service computer and inputting the second group of information responses to the service computer from the first user terminal.

3. A method according to claim 2, including issuing commands and, the first, the unreformatted second and the reformatted second groups of information responses to the control means from the service computer to establish communication with the bridge to a plurality of parties.

4. A method according to claim 3, including at least some of said plurality of parties having additional terminals, and connecting said additional terminals to the service computer for establishing a path for digital display information between the terminals of said parties having terminals.

5. A method according to claim 4, including passing a note of text comprising digital display information from one of said party terminals to said service computer, storing the note in said service computer and transmitting the note from said service computer to at least one other of said party terminals.

6. A method according to claim 1, including storing a plurality of directories in said service computer, each directory containing information for a plurality of parties, the information for each party comprising a plurality of second group information responses for that party.

7. A method according to claim 6, including identifying each directory with a selected user for permitting selection of parties from at least one directory afer use by the selected user.

8. A method according to claim 7, including listing actual parties' names in the directory with actual telephone numbers for those parties, the party names comprising some of the second group of information responses, the reformatting comprising selecting unique pseudonyms for each actual party name, the pseudonym being unique for the same party name if used in more than one directory for maintaining unique pseudonyms and telephone number combinations for use in operating the control means of the teleconferencing system.

9. A method according to claim 2, including transmitting a status screen from said service computer to said first user terminal, said status screen including a menu showing a plurality of commands, each selectable by the user of the first user terminals, and a listing of parties for a selected conference, including all the second group information responses for each party shown.

10. A method according to claim 2, including transmitting a status screen from said service computer including all the second group of information responses for each party to the first user terminal.

11. A method according to claim 9, including listing said parties on said status screen according to a numerically ordered list of leg numbers, each party having a constant leg number during the operation of a selected conference.

12. A method according to claim 6, including issuing commands and, the first, the unreformatted second and the reformatted second groups of information responses to the control means from the service computer to establish communications with the bridge to a plurality of parties, said parties being all the parties in a selected directory.

13. A method according to claim 3, including storing in the service computer, billing information for the conference and, at the conclusion of the conference, transmitting a billing screen from said service computer to said first user terminal, said billing screen, including a listing of all billing charges for the conference.

14. A method according to claim 9, including indicating on the status screen that an operator is accessing the communications among said parties.

15. A method according to claim 4, including indication that an operator is accessing the communications among said parties, on said first and additional terminals.

16. A method according to claim 1, wherein the names of parties for communication comprise at least some of the second group of information responses, the names being reformatted to ensure that said party names are not duplicated when applied to the control means as the reformatted second group of informaton responses.

17. A method according to claim 1, including operating a plurality of said teleconferencing systems, connecting the service computer to the control means of all said teleconferencing systems.

18. A method according to claim 2, including operating a plurality of said teleconferencing systems, connecting the service computer to the control means of all said teleconferencing systems, and selecting one of said teleconferencing systems using the first user terminal.

19. A method according to claim 1, including detecting when a party is no longer in communication with the bridge and issuing commands and, the first, the unreformatted second and the reformatted second groups of information responses to the control means from the service computer to re-establish communication with the bridge to a party that is no longer in communication with the bridge.

20. A method according to claim 1, including identifying a party who initiates communication with the bridge.

21. A method according to claim 1, including issuing commands and, the first, the unreformatted second and the reformatted second groups of information responses at a specified time and date to the control means from the service computer to establish communication with the bridge to a plurality of parties.

22. A method according to claim 1, including reserving in the service computer a first conference having a conference name forming one of the first group of information responses, and a name of a second conference to be combined with the first conference, issuing commands from the service computer to the control means to store the first and second conference in the control means and at an initial time when both conferences have started, automatically combining the first and second conferences together.

23. A method according to claim 1, including detecting that only one party of a plurality of parties in communication with the bridge remains in communicaton with the bridge, and issuing commands, and the first, the unreformatted second and the reformatted second groups of information responses to the control means from the service computer to disconnect the one party from communication with the bridge.

24. A method according to claim 9, wherein said status screen has a plurality of pages, the method including indicating that status information for parties not shown on the status screen has changed on another page, and indicating the page in which the information has changed.

25. A method according to claim 4, including sending an indication from said additional terminals to at least one of the first user terminals and the service computer, said indication being a request for attention.

26. A method according to claim 17, including connecting a first user terminal to the service computer and inputting the second group of information responses to the service computer from the first user terminal, and estimating the total cost of using each of the bridges connected to said service computer to establish communication with a plurality of parties prior to an establishment of communcation, and transmitting said estimates of the total cost to said first user terminal.

27. A method according to claim 22, including issuing commands and, the first, the unreformatted second and the reformatted second groups of information responses to the control means from the service computer to establish communication with the bridge to a plurality of parties, including the party that initiated communication with the bridge.

28. A method according ro claim 22, including starting the first conference, combining the second conference into the first conference at the initial time after both conferences have been started, the second conference including at least one conferee having a conference access code to be input into the service computer, automatically combining a conferee into the combined first and second conferences when the conferee enters its access code after the initial combining of the first and second conferences.

29. A method according to claim 2, wherein the first user terminal has a keyboard for sending indications to the service computer, the method including sending an indication from the keyboard of the first user terminal to the service computer, requesting an operator assistance from the service computer without interrupting any connection between any party and the ports of the bridge.

30. A method according to claim 6, including connecting a first user terminal to the service computer and inputting the second group of information responses to the service computer from the first user terminal, transmitting a status screen from the service computer to the first user terminal, the status screen including the display of information for at least one party of a directory, sending an indication from the first user terminal to the service computer, requesting the service computer to connect the party having the displayed information with a port of the bridge or requesting the service computer to display information concerning a subsequent party in the directory on the status screen.

31. A method according to claim 1, wherein the plurality of ports of the bridge are divided into segments each for receiving one type of telecommunication service, estimating the cost for a conference using a selected combination of segments and selecting the least expensive combination of segments for conducting the conference.

32. An apparatus for operating a teleconferencing system, the teleconferencing system having a bridge with a plurality of ports, each for communication with a party, and control means responsive to a plurality of commands and a plurality of information responses for each command to execute functions of the bridge in establishing and disconnecting communication with the parties, the plurality of information responses including a first group and a second group of information responses, the apparatus, comprising:
  a service computer connectable to the control means for issuing commands and for issuing first and second group information responses for causing the bridge to execute functions corresponding to each command; and
  a plurality of party terminals, each connectable to said service computer for receiving a display screen from said service computer concerning a conference, and for issuing commands, the second group information responses to said control means to conduct a conference.

33. An apparatus according to claim 32, wherein said service computer is programmed to store the first group of information responses and to receive the second group of information responses from one of said terminals, said service computer being programmed to issue a command to the control means of a bridge and to thereafter supply the first group of information responses and a reformatted version of at least some of the second group of information responses required for executing the function of the bridge corresponding to said command.

34. An apparatus according to claim 32, wherein said service computer is programmed to store a plurality of directories, each containing information for a plurality of parties, the information for each party including second group information responses usable by said service computer, in conjunction with first group information responses to operate the control means and bridge.

35. An apparatus according to claim 33, wherein each directory is identified to a selected user for use in conducting a plurality of conferences.

36. An apparatus according to claim 32, wherein said service computer is programmed to store data sent by one of said party terminals for dissemination to at least one other party terminal, and for sending said data to said at least one other party terminal.

37. A method of operating a plurality of teleconferencing bridges, each bridge having a plurality of ports for communication with a plurality of parties and control means responsive to a plurality of commands, and a plurality of information responses for each command, each bridge being controlled to execute functions according to the commands and in response to inputs of information responses into the control means, the method comprising:

connecting a single service computer to the control means of at least one of the bridges at a time, for issuing commands to the at least one for causing the at least one bridge to execute functions corresponding to the commands, the computer being connectable to the control means of each of the bridges;

storing at least some of the plurality of information responses in the service computer which can be utilized for the commands in each of the bridges;

sending a selected command from the service computer to the control means of at least one of the bridges to initiate a function corresponding to the selected command in the at least one bridge; and supplying the information responses for the selected command from the service computer to the control means of the at least one bridge.

* * * * *